US012519516B2

(12) United States Patent
Balboni

(10) Patent No.: US 12,519,516 B2
(45) Date of Patent: Jan. 6, 2026

(54) ENERGY EFFICIENT WIRELESS COMMUNICATIONS USING ADAPTIVE PHASED ANTENNA ARRAY

(71) Applicant: Analog Devices, Inc., Wilmington, MA (US)

(72) Inventor: Edmund J. Balboni, Littleton, MA (US)

(73) Assignee: Analog Devices, Inc., Wilmington, MA (US)

( * ) Notice: Subject to any disclaimer, the term of this patent is extended or adjusted under 35 U.S.C. 154(b) by 213 days.

(21) Appl. No.: 18/373,145

(22) Filed: Sep. 26, 2023

(65) Prior Publication Data

US 2025/0105891 A1    Mar. 27, 2025

(51) Int. Cl.
*H04L 5/12* (2006.01)
*H01Q 3/24* (2006.01)
*H04B 7/06* (2006.01)

(52) U.S. Cl.
CPC .............. *H04B 7/0608* (2013.01); *H01Q 3/24* (2013.01)

(58) Field of Classification Search
CPC ................................ H04B 7/0608; H01Q 3/24
USPC ................ 375/262, 260, 259, 219, 295, 316
See application file for complete search history.

(56) References Cited

U.S. PATENT DOCUMENTS

| 7,215,297 | B2 | 5/2007 | Gothard et al. |
| 8,155,712 | B2 | 4/2012 | Gilb et al. |
| 10,924,164 | B2 | 2/2021 | Brunel et al. |
| 11,134,473 | B2 | 9/2021 | Raghavan et al. |
| 11,283,170 | B2 | 3/2022 | Kovacic |
| 2009/0015473 | A1 | 1/2009 | Tomita et al. |
| 2011/0293033 | A1* | 12/2011 | Kushnir ............... H04L 27/2614 375/295 |
| 2012/0182948 | A1* | 7/2012 | Huang ................. H04L 27/2614 370/329 |
| 2015/0382268 | A1* | 12/2015 | Hampel ............ H04W 36/0072 455/436 |
| 2018/0248598 | A1 | 8/2018 | Gambahaya |
| 2019/0324136 | A1* | 10/2019 | Amadjikpe ............. G01S 13/70 |
| 2020/0058986 | A1 | 2/2020 | Dorsey |
| 2025/0102654 | A1* | 3/2025 | Dai ...................... H01Q 25/001 |

FOREIGN PATENT DOCUMENTS

WO    WO 2019/199326    10/2019

OTHER PUBLICATIONS

Auer et al., "How much energy is needed to run a wireless network?", IEEE Wireless Communications, Oct. 2011, pp. 40-49.

(Continued)

*Primary Examiner* — Zewdu A Kassa
(74) *Attorney, Agent, or Firm* — Knobbe, Martens, Olson & Bear, LLP

(57) ABSTRACT

Aspects of this disclosure relate to energy efficient wireless communications. Data can be wirelessly transmitted from a phased antenna array and antenna elements of the phased antenna array can be dynamically activated and/or deactivated. In certain embodiments, the antenna elements can be activated based on range and/or environmental condition(s), such as interference and/or range. As the number of active antenna elements changes, relatively low spectral efficiency and a relatively low peak to average power ratio can be maintained.

20 Claims, 13 Drawing Sheets

(56) References Cited

OTHER PUBLICATIONS

Buckwalter et al., "Fundamental Limits of High-Efficiency Silicon and Compound Semiconductor Power Amplifiers in 100-300 GHZ Bands", ITU Journal on Future and Evolving Technologies, Oct. 2021, 2(7): in 12 pages.

Chen et al., "Fundamental Tradeoffs on Green Wireless Networks", IEEE Communications Magazine, Jun. 2011, in 17 pages.

Han et al., "Large-Scale Antenna Systems with Hybrid Analog and Digital Beamforming for Millimeter Wave 5G", IEEE Communications Magazine, Jan. 2015, pp. 186-194.

Lee, B.M., "Energy Efficiency Gain of Cellular Base Stations with Large-Scale Antenna Systems for Green Information and Communication Technology", Sustainability, 2017, 9(1123): 1-18.

McCune, E., "There is Not Enough Electricity to Run 5G—Finding the Road to 6G", IEEE Standards, 2020, in 12 pages.

Olsen et al., "The $aR^b$ Relation in the Calculation of Rain Attenuation", IEEE Transactions on Antennas and Propagation, Mar. 1978, vol. AP-26, No. 2, pp. 318-329.

Raycom, "Link Calculation Website", available at: https://www.racom.eu/eng/products/m/ray/app/linkcalc/calculation.html (accessed Dec. 13, 2023).

Tafuri, F.F., "Linearity and Efficiency Enhancement Techniques for Mobile Communication Power Amplifiers", Thesis, Jun. 2014, in 153 pages.

Vittoz, E.A., "Future of Analog in the VLSI Environment", Conference paper, Jun. 1990, in 4 pages.

Vittoz, E.A., "Low-Power Design: Ways to Approach the Limits", IEEE International Solid-State Circuits Conference, 1994, pp. 14-18.

Wikipedia—"Shannon-Hartley theorem"; available at: https://en.wikipedia.org/wiki/Shannon%E2%80%93Hartley_theorem (accessed Dec. 13, 2023).

Zhang et al., "First 20 Years of Green Radios", IEEE Transactions on Green Communications and Networking, Aug. 2019, pp. 1-15.

Chen, C.C., "Attenuation of Electromagnetic Radiation by Haze, Fog, Clouds, and Rain," Apr. 1975, in 41 pages.

Grace et al., "Using Cognitive Radio to Deliver 'Green' Communications." IEEE Proceedings of the 4th International Conference on Crowncom, 2009, in 6 pages.

Han et al., "Greener Physical Layer Technologies for 6G Mobile Communications." IEEE Communications Magazine, Apr. 2021, pp. 68-74.

Hogg, D.C., "Fun with the Friis Free-Space Transmission Formula." IEEE Antennas and Propagation Magazine, Aug. 1993, 35(4): pp. 33-35.

I et al., "Toward Green and Soft: A 5G Perspective." IEEE Communications Magazine, Feb. 2014, pp. 66-73.

Sanduleanu et al., "Chapter 2: Power considerations in sub-micron digital CMOS." Springer, 2002, in 21 pages.

\* cited by examiner

| State | | BS | MS | Sum |
|---|---|---|---|---|
| MS TX | # Elements | 464 | 5 | |
| | Eb (nJ)/bit | 9.5 | 0.02 | 9.5 |
| | Pdisp [W] | 19 | 0.034 | 19 |
| MS RX | # Elements | 100 | 1 | |
| | Eb (nJ)/bit | 3.6 | 0.002 | 3.6 |
| | Pdisp | 7.3 | 0.004 | 7.3 |

Max PA Efficiency 20%
RX NF: 2
Fc=95G
Capacity 2GBPS
Range : 1000 meters

| State | | BS | MS | Sum |
|---|---|---|---|---|
| MS TX | # Elements | 22 | 22 | |
| | Eb (nJ)/bit | 0.43 | 0.79 | 1.22 |
| | Pdisp [W] | 0.87 | 1.58 | 2.45 |
| MS RX | # Elements | 22 | 22 | |
| | Eb (nJ)/bit | 0.79 | 0.43 | 1.22 |
| | Pdisp | 1.58 | 0.87 | 2.45 |

| | SE=2 |
|---|---|
| BW | 1G |
| Pc | 0.04 or 0.0 |
| Pte | 0.004 |
| Ka | 1e-13 |
| kd | 1e-12 |
| P0 | 0.02 |

FIG. 12

ENERGY EFFICIENT WIRELESS COMMUNICATIONS USING ADAPTIVE PHASED ANTENNA ARRAY

BACKGROUND

Technical Field

The disclosed technology wireless communications. Embodiments of this disclosure relate to wireless communications with a phased antenna array.

Description of Related Technology

The increasing demand for wireless data has led to multiple generations of cellular standards. Each new generation has brought improvements in data capacity by employing increasing complex modulation schemes as well as new band allocations to increase available bandwidth. Wireless communication is reaching a point where significant energy is being consumed by wireless communication.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a radio frequency system with energy efficient wireless communication. The radio frequency system includes a phase antenna array and a control circuit. The phased antenna array includes antenna elements. The phased antenna array is configured to wirelessly exchange data over a link at a radio frequency. The control circuit is configured to selectively active individual antenna elements of the antenna elements. The radio frequency system is configured to maintain a spectral efficiency in a spectral efficiency range from 1 bit per second per Hertz ((bit/s)/Hz) to 6 (bit/s)/Hz and a peak to average power ratio (PAPR) in a PAPR range from 0 decibels (dB) to 6 dB for wirelessly exchanging data over the link as different numbers of the antenna elements are activated.

The control circuit can selectively activate the individual antenna elements based on a range associated with the link. The control circuit can selectively activate the individual antenna elements based on interference associated with the link so as to compensate for the interference. The control circuit can selectively activate the individual antenna elements of the antenna elements based on a weather condition so as to compensate for loss in the weather condition. The weather condition can be rain.

The radio frequency system can include a power amplifier in a signal path to an antenna element of the antenna elements. The control circuit can turn off the power amplifier such that the power amplifier is off when the antenna element is deactivated.

The radio frequency can be in a range from 90 gigahertz (GHz) to 300 GHz. The link can have a bandwidth of at least 0.25 GHz. The link can have a capacity in a range from 0.5 gigabits per second (GBPS) to 5 GBPS.

The spectral efficiency range can be from 1 (bit/s)/Hz to 4 (bit/s)/Hz. The PAPR range can be from 0 dB to 4 dB. The PAPR range can be from 0 dB to 3 dB.

The control circuit can selectively activate the individual antenna elements such that power per bit varies by no more than +/−2 dB.

Another aspect of this disclosure is a method of energy efficient wireless communication. The method includes wirelessly transmitting first data using antenna elements of a phased antenna array, dynamically activating at least one additional antenna element of the phased antenna array, and wirelessly transmitting second data using the antenna elements and the at least one additional antenna elements of the phased antenna array. The first data and the second data are wirelessly transmitted with a spectral efficiency maintained in a range from 1 bit per second per Hertz ((bit/s)/Hz) to 6 (bit/s)/Hz and a peak to average power ratio (PAPR) maintained in a range from 0 decibels (dB) to 6 dB.

The dynamically activating can be based on an increase in range associated with the wirelessly transmitting the second data relative to the wirelessly transmitting the first data. The dynamically activating can be based on an increase in a rain rate. The dynamically activating can include turning on a power amplifier in a signal path to the one antenna element.

The wirelessly transmitting the first data can be performed over a link at a radio frequency in a range from 90 gigahertz (GHz) to 300 GHz.

Power per bit can vary by no more than +/−2 dB for the wirelessly transmitting the second data relative to the wirelessly transmitting the first data.

The phased antenna array can have more antenna elements activated for the wirelessly transmitting the first data than an antenna array of on a wireless device that receives the first data from the phased antenna array.

Another aspect of this disclosure is a wireless communication system with energy efficient wireless communication. The wireless communication system includes a phased antenna array comprising antenna elements, a radio frequency front end, and a baseband unit in communication with the radio frequency front end. The phased antenna array is configured to wirelessly transmit data over a link at a radio frequency. The radio frequency front end includes power amplifiers and control circuitry. The power amplifiers are in signal paths to the antenna elements. The control circuitry is configured to selectively activate one or more of the power amplifiers. The wireless communication system is configured to maintain a spectral efficiency in a spectral efficiency range from 1 bit per second per Hertz ((bit/s)/Hz) to 6 (bit/s)/Hz and a peak to average power ratio (PAPR) in a PAPR range from 0 decibels (dB) to 6 dB as different numbers of the power amplifiers are activated for wirelessly transmitting data over the link.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will be described, by way of non-limiting example, with reference to the accompanying drawings.

FIG. 12 includes tables comparing power consumption for wireless communications between a mobile station and base station with different numbers of antenna elements used.

DETAILED DESCRIPTION OF CERTAIN EMBODIMENTS

Figure 1B:
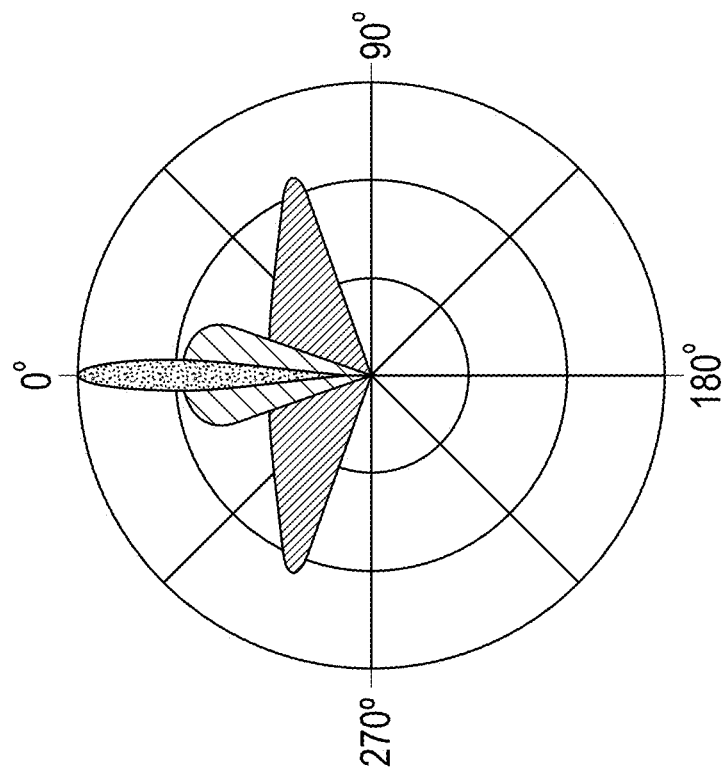
FIG. 1B illustrates example beams that can be transmitted from the adaptive phased antenna array of FIG. 1A.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the illustrated elements. Further, some embodiments can incorporate any suitable combination of features from two or more drawings. The headings are provided for convenience only and do not impact the scope or meaning of the claims.

Aspects of this disclosure relate to systems with an adaptive phased antenna array for wireless communications over a link. A phased antenna array includes antenna elements that can be activated and/or deactivated. Individual antenna elements of the antenna elements can be selectively activated. For example, a control circuit can turn on circuitry (for example, a power amplifier) and/or couple circuitry to an individual antenna element to activate the individual antenna element. The antenna elements of the phased antenna array can be activated and/or deactivated to compensate for signal losses. The antenna elements can be activated based on one or more of range, interference, rain, or the like. Wireless communications over the link have spectral efficiency and peak to average power ratio that are within respective ranges for efficient wireless communications, even as the number of antenna elements of the phased antenna array that are activated changes. The spectral efficiency can be maintained within a range from 1 bit per second per Hertz to 6 bits per second per Hertz and a peak to average power ratio can be maintained in a range from 0 decibels to 6 decibels for wirelessly exchanging data over the link as different numbers of the antenna elements are activated. In certain applications, the spectral efficiency can be maintained within a range from 1 bit per second per Hertz to 4 bits per second per Hertz and a peak to average power ratio can be maintained in a range from 0 decibels to 4 decibels. Related methods of energy efficient wireless communication are disclosed with antenna elements are dynamically activated and spectral efficiency and peak to average power ratio are maintained within certain ranges.

Energy consumption for wireless communications continues to grow and is projected that by the end of the decade could consume as much as 10-15% of worldwide energy usage. This can be due to exponentially increasing demand for data with a limited available bandwidth, resulting in the use of complex modulation schemes capable of cramming more data into this limited bandwidth. These complex modulations involve higher receiver signal to noise ratio (SNR), which can result in higher transmitter power consumption per bit of data. Recent advances in high performance silicon processes have opened the possibility of using higher frequencies where more bandwidth is available and where large arrays are feasible in a small area and at a reasonable cost. In this disclosure, the fundamental limits to wireless data transmission are examined and the impact of higher frequencies, with higher available bandwidths on the energy involved for sending data wirelessly.

Using the Shannon-Hartley Capacity theorem in conjunction with Friis equations for wireless signal transmission and reception, this disclosure addresses significant factors that drive power consumption in radio data transmission. The analysis leads to a new way of operating a radio link, by turning elements on as range increases (or turning off elements as range decreases), thus providing a mechanism to adjust power consumption for distance in a way that is easy to implement and with a resulting beam pattern that varies with range in a useful way. In addition to range, one or more weather conditions (e.g., rain), interference, and/or one or more other environmental conditions can be used to active and/or deactivate antenna elements of a phase array for efficiency.

Recent trends towards modulation waveforms with high spectral efficiency (SE) comes at a relatively high energy cost and lower spectral efficiency modulation can improve efficiency. Future links, operating at higher frequencies with increased bandwidth, can provide a way to improve both capacity and efficiency. Power consumption does not necessarily increase with high operating frequencies and in fact energy can scale with $(\text{frequency/bandwidth})^{2/3}$. Accordingly, if a fixed fractional bandwidth is maintained as center frequency is increased, the link can be energy neutral. Since more bandwidth is available at higher frequencies, there is an opportunity to increase capacity and improve power efficiency simultaneously.

In addition, using a low-spectral efficiency modulation, operating active power amplifiers in a high power amplifier efficiency region with a low peak to average power ratio (PAPR) can realize low energy wireless data links. Spectral efficiency (SE) values in this disclosure are in in bits per second per Hertz ((bits/sec)/Hz) unless otherwise stated.

Fewer elements can be active when the distance between transmitter and receiver is short and additional elements can be turned on as the distance between transmitter and receiver increases. The result can be a broader beam at small distances moving toward a pencil beam at the edge of the range. Energy density at the receiver can be kept substantially constant with range while operating the transmitter at a high and/or maximum efficiency at all ranges.

Optimum transmit power can be calculated and related to circuit-power, which is driven also by spectral efficiency and bandwidth and that the optimal per-element transmit power can be significantly lower than typically assumed. For example, by increasing bandwidth by 4×, which can be done at high frequencies, a 7× reduction in power dissipation can be realized while providing the same link capacity. This power reduction can be even more pronounced since the low energy array has low per element transmit power resulting in the reduction and/or elimination of active cooling.

Power Consumption from Cellular Networks

As discussed above, the increasing demand for wireless data has led to multiple generations of cellular standards. Each new generation has brought large improvements in data capacity by employing increasing complex modulation schemes as well as new band allocations to increase available bandwidth. The new modulation schemes can provide for more bits within a limited bandwidth but can do so at the cost of a significant increase in transmit energy per bit of data transferred. This tradeoff has been employed to meet the demand for data given the modest increases in available bandwidth while data demand has grown exponentially.

Wireless communications are reaching a point where the global data demand is a significant factor in energy usage with an attendant increase in cost and $CO_2$ emissions. The majority of the power in cellular communication can be consumed in a radio access network (RAN), with significantly less power consumed by mobile devices and the core network.

In a base station, power can be consumed by signal processing, air conditioning, power conversion, power amplifiers, and wireless signal transmission. In certain applications for a macro base station, the majority of the power can be consumed by the power amplifiers. For example, in some example applications power amplifiers can dissipate around 64% of power. Power amplifiers can have 10% to 20% efficiency. Overall power efficiency of a base station can be around 4% in certain applications.

While there is increasing energy cost for wireless data delivery with associated operating expenses and capital expenditures, there is a concerted effort to reduce greenhouse gas emissions. There has been some activity toward energy savings in base stations, such as shutting down some channels at night when traffic is low. Ideally, base stations would scale up energy usage with traffic load.

In this disclosure, technical solutions are provided to enhance and/or optimize a communications link for minimum energy usage with data traffic but also enhance or optimize to minimize energy usage with distance between the transmitter and receiver.

Transmit power can be reduced and/or minimized by turning off elements to save power, which can result in using fewer elements for a given range. In addition, using a low-spectral efficiency modulation and operating the active power amplifiers a high power amplifier efficiency region with a low PAPR is can be significant to realizing low energy wireless data links. Fewer elements can be used when the distance is relatively short, and additional elements can be turned on as the distance increases. The result can be a relatively broad beam at small distances moving toward a pencil beam at the edge of the range. Accordingly, the received energy per bit can be kept generally constant with range while operating the transmitter at or near maximum efficiency at all ranges. The received energy per bit can be kept constant within +/−1 to 2 dB in accordance with any suitable principles and advantages disclosed herein.

Revisiting Shannon-Hartley

The Shannon-Hartley theorem relates the maximum capacity (C) in bits/second of a given link to a link bandwidth (BW) and a link signal-to-noise ratio (SNR):

$$C = BW * \log_2(1 + SNR) \qquad \text{(Equation 1)}$$

Modern communications operate with limited available BW and can increase SNR to improve capacity. This increase in SNR can result in an increase in a received power specification. This can be shown where the SNR term above can be expanded:

$$C = BW * \log_2\left(1 + \frac{P_r}{k * T * F * BW}\right) \qquad \text{(Equation 2)}$$

In Equation 2, Pr represents the received signal power, k*T*F*BW represents the received noise power. If we then define spectral-efficiency (SE) as SE=C/BW in bits per second per Hertz ((bits/sec)/Hz) and define energy per bit as Eb=Pr/(SE*BW) in Joules per bet (J/bit)] and N0=k*T*F, then Equation 2 can be recast as:

$$SE = \frac{C}{BW} = \log_2\left(1 + \frac{Eb}{N0} * SE\right) \qquad \text{(Equation 3)}$$

Using Equation 3, a data rate (R) should be below a curve for where the rate is equal to the capacity limit. Several modulation techniques involve increasing energy with higher SE. Energy per bit can increase dramatically when moving from a lower SE of 1 to 2 up to a higher SE of 8 to 16. This can represent a large increase in receive power translating directly to an increase in transmitter effective isotropic radiated power (EIRP) specification by up to 20-30 dB. This is indicated by using the Friis free-space transmission formula shown in Equation 4:

$$P_r = \frac{P_T * A_r * A_t * f^2}{r^2 * c^2} \qquad \text{(Equation 4)}$$

In Equation 4, Pr represents the received power, $P_T$ represents the transmit power, Ar represents the receiver antenna effective area, At represents the transmit antenna effective area, f represents the operating frequency, r represents the distance and c is the speed of light. Substitute the above for Pr in Equation 1 and solving for $P_T$ can be expressed as:

$$P_T = (2^{SE} - 1)\frac{k*T*F*BW*c^2*r^2}{A_r*A_t*f^2} \quad \text{(Equation 5)}$$

Equation 5 indicates that $P_T$ increases exponentially with SE, where SE=C/BW, drops linearly with antenna area and with the square of frequency. Normalizing the power by dividing by the capacity can provide transmit energy per bit Eb=$P_T$/C in Joules per bit:

$$E_b = (2^{SE} - 1)\frac{k*T*F*c^2*r^2}{SE*A_r*A_t*f^2} \quad \text{(Equation 6)}$$

Equation 6 indicates that transmit energy can be minimized by using large antennas operating at high frequencies. Large antenna area can be realized using a parabolic dish mechanically steered. Certain modern antenna systems favor electronically steered phased arrays formed by using multiple antenna elements. There can be an exponential dependence on SE where Eb increases by over 100× when SE is increased from 1 to 10. This large increase in energy can be mitigated by operating with a relatively low SE (e.g., SE~1), while capacity can be maintained using high frequencies where bandwidth may be more available.

There can be an inverse square law dependence on frequency. As an example, if a communications data link at 26 gigahertz (GHz) is moved to 75 GHz while keeping antenna areas constant, the energy per bit can drop by 9×. This can result from the narrowing of the transmit antenna beam width by 3× and the receiver beamwidth also by 3×, resulting in 9× more received signal power.

Equation 5 for Pr can be adapted for arrays by assuming antenna element spacing of λ/2, in which case we can calculate the number of transmit elements (nt) and receiver elements (nr) based on the antenna areas. Equation 5 then becomes:

$$P_T = n_t * P_{TE} = (2^{SE} - 1)\frac{16*k*T*F*BW*f^2*r^2}{n_r*n_t*c^2} \quad \text{(Equation 7)}$$

Transmit energy per bit can be calculated using Eb=$P_T$/C in J/bit resulting in:

$$E_b = (2^{SE} - 1)\frac{16*k*T*F*f^2*r^2}{SE*n_r*n_t*c^2} \quad \text{(Equation 8)}$$

Total dissipated power Pdisp can be calculated for the link by summing the transmit power $P_T$ in Equation 7 divided by the power amplifier efficiency with the transmit and receiver circuit power (Pc) for each transmit and receive element:

$$P_{disp} = n_t * \left(\frac{P_{TE}}{\eta} + Pc\right) + n_r * Pc \quad \text{(Equation 9)}$$

With some manipulation, Equation 9 can be re-written as:

$$P_{disp} = (2^{SE} - 1)\frac{16*k*T*F*BW*f^2*r^2}{\eta*n_r*n_t*c^2} + (nt+nr)*Pc \quad \text{(Equation 10)}$$

The inventor observed from Equation 10 that as the number of elements in the array increases, the 1st term results in reduced power while the 2nd term increases with number of elements indicating there is an optimal array sizing for minimal power dissipation.

In Equation 7 for $P_T$, there are nt transmit elements with each element transmitting $P_{TE}$ watts of power. Rearranging the above equation, the number of elements in the transmitter and receiver to deliver bits at a given rate over a given range can be determined by:

$$n_t^2 * n_r = (2^{SE} - 1)\frac{16*k*T*F*BW*f^2*r^2}{P_{TE}*c^2} \quad \text{(Equation 11)}$$

If we further assume that the number of elements in the receiver and transmitter are the same, then:

$$n = \sqrt[3]{(2^{SE} - 1)\frac{16*k*T*F*BW*f^2*r^2}{P_{TE}*c^2}} \quad \text{(Equation 12)}$$

Equation 12 informs on the minimum number of elements to realize a link given the basic parameters in the array for any given range. Equation 12 can be used to calculate the transmitter and receiver power consumption:

$$P_{disp} = n * \left(\frac{P_{TE}}{\eta} + 2*Pc\right) \quad \text{(Equation 13)}$$

Transmit power is a function of the number of transmit elements, the element transmit power, the power amplifier efficiency n, and the element circuit power Pc. Element circuit power is assumed to be the same for transmit and receive elements since dynamic range and bandwidth specification are nearly the same. Power amplifier efficiency is also a function of SE. The power "backoff" or PAPR specification for relatively simple modulations having small SE can be in the 0-3 dB range, while for large SE PAPR can be in the 8-12 dB range. Table 1 summarized SE and PAPR for certain wireless communication standards.

TABLE 1

| Standard | Max SE (bit/s/Hz) | PAPR (dB) |
|---|---|---|
| GSM | 0.17 | 0 |
| EDGE | 0.2 | 3.2 |
| LTE | 16.32 (4 × 4 MIMO) | 7-10 |

For class-B power amplifiers, efficiency can be approximated as $$\eta = \frac{\eta_{max}}{\sqrt{PAPR}} \text{ and } PAPR = \frac{SE+1}{\left(1+\frac{SE}{20}\right)},$$

resulting in:

$$\eta = \frac{\eta_{max}}{\sqrt{\frac{SE+1}{(1+SE/20)}}} \quad \text{(Equation 14)}$$

Equation 20 for efficiency can apply primarily to class-B power amplifier operation and can be modified for other power amplifier types. Using the above approximations total transmit power dissipation can then be given by:

$$P_{disp} = \sqrt[3]{(2^{SE}-1)\frac{16*k*T*F*BW*f^2*r^2}{P_{TE}*c^2}} * \left(\frac{P_{TE}*\sqrt{\frac{SE+1}{\left(1+\frac{SE}{20}\right)}}}{\eta_{max}} + 2*Pc\right) \quad \text{(Equation 15)}$$

When normalized for data rate, Equation 15 can result in the energy per bit of:

$$Eb = \frac{P_{disp}}{C} = \sqrt[3]{(2^{SE}-1)\frac{16*k*T*F*f^2*r^2}{SE^3*BW^2*P_{TE}*c^2}} * \left(\frac{P_{TE}*\sqrt{\frac{SE+1}{\left(1+\frac{SE}{20}\right)}}}{\eta_{max}} + 2*Pc\right) \quad \text{(Equation 16)}$$

Equation 16 provides the minimum energy to transmit data at a given range when the number of active elements is adjusted for range. This equation along with the equation to calculate the number of elements can be used to reduce and/or minimize energy in a communications link and to adapt the link with range while maintaining low (e.g., lowest feasible) energy for a phased antenna array.

Adaptive Phased Antenna Array Architecture

The number of array elements for a given data link can be calculated by Equation 12. This equation can define the minimum number of elements for a given set of conditions. The energy under these conditions can be calculated using Equation 16.

Transmit power can be minimized by using a minimum number of elements for a given range and shutting off other elements to save power. The elements being deactivated can include antenna elements of a phased antenna array and circuitry of the signal chain driving such antenna elements including power amplifiers. In addition, using a low SE modulation and operating the active power amplifier in the high power added efficiency (PAE) region with a low PAPR can be significant in realizing low energy wireless data links.

Figure 1A:
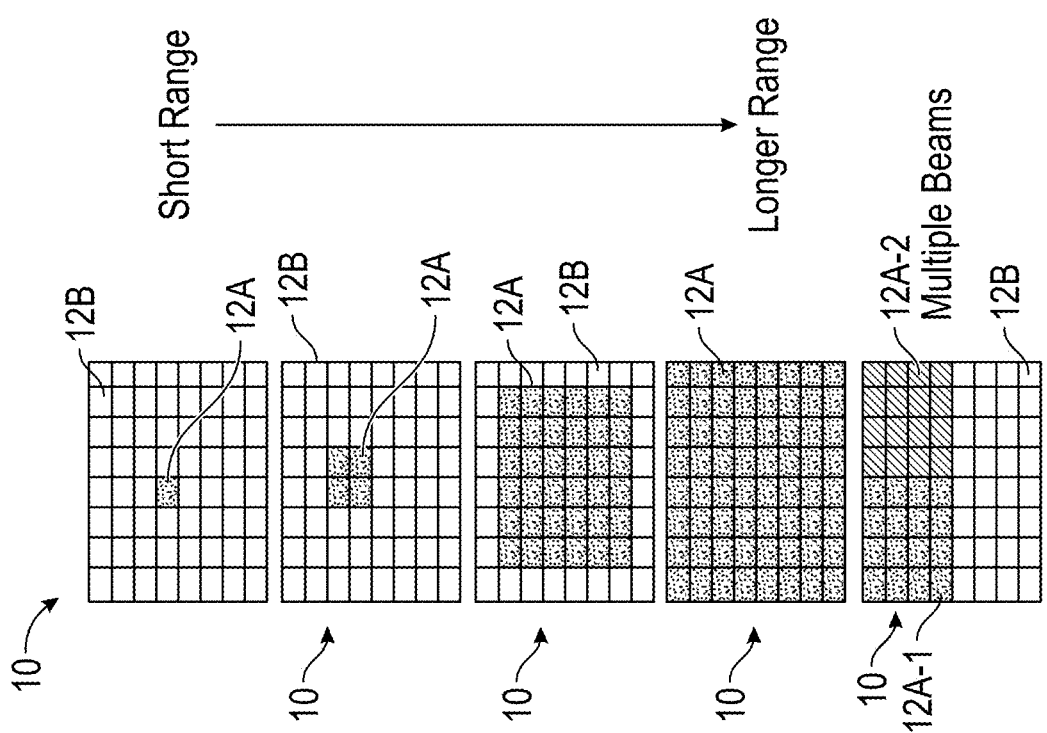
FIG. 1A schematically illustrates an adaptive phased antenna array for wirelessly transmitting data over different distances according to an embodiment.

FIG. 1A schematically illustrates an adaptive phased antenna array 10 for wirelessly transmitting data over different distances according to an embodiment. The phased antenna array 10 includes antenna elements 12. The antenna elements 12 can be active antenna elements 12A or inactive antenna elements 12B. The active antenna elements 12A can transmit radio frequency signals. The inactive antenna elements 12B are not configured to transmit radio frequency signals. Similarly, in a receiving context, signals received at active antenna elements 12A can be processed by receive circuitry and signals received by the inactive antenna elements 12B are not process by received circuitry. As used herein, antenna elements 12 may collectively refer to both active antenna elements 12A and inactive antenna elements 12B.

FIG. 1A illustrates that the phased antenna array 10 can have more active elements 12A as range increases for a link. The range can represent a distance between a transmitting antenna array and a receiving antenna array. The number of active antenna elements 12A can be determined based on Equation 12. A control circuit can dynamically active and deactivate antenna elements 12 of the adaptive phased antenna array 10. As different numbers of antenna elements 12 are activated, SE and PAPR can be maintained within certain ranges to achieve power efficient wireless communication. In addition, energy per bit can be generally constant as different numbers of antenna elements 12 are activated.

FIG. 1B illustrates example beams that can be transmitted from the adaptive phased antenna array 10 of FIG. 1A. When the range is relatively small, few antenna elements 12 are active and most antenna elements 12 are inactive. As the range increases, additional antenna elements 12 can be activated. The corresponding circuitry including power amplifiers driving the additional antenna elements 10A can also be activated as distance increase. The adaptive phased antenna array 10 can transmit a broad beam at small distances. The adaptive phased antenna array 10 can transmit a narrow beam (e.g., a pencil beam) at larger distances near a maximum range. By adjusting the number of active antenna elements 12A with range as shown in FIG. 1A, the energy per bit can be kept generally constant with range while operating the transmitter near maximum efficiency at all ranges.

FIG. 1A also illustrates that the adaptive phased antenna array 10 can transmit multiple beams. For example, a first beam can be transmitted from active antenna elements 12A-1 and a second beam can be transmitted from active antenna elements 12A-2. The number of active antenna elements 12A can be adjusted as range changes for each of the multiple beams.

Any suitable principles and advantages related to activating and/or deactivating elements for transmitting from a phased antenna array can be applied to receiving with a phased antenna array.

While FIG. 1A illustrates changes in the number of active antenna elements based on range, the number of active antenna elements can alternatively or additional be changed based on an environmental condition, such as one or more of interference, rain, fog, haze, clouds, another weather condition where signal losses occur, or any other suitable environmental condition. More antenna elements can be activated to compensate for losses due to a weather condition in accordance with any suitable principles and advantages disclosed herein.

Figure 1C:
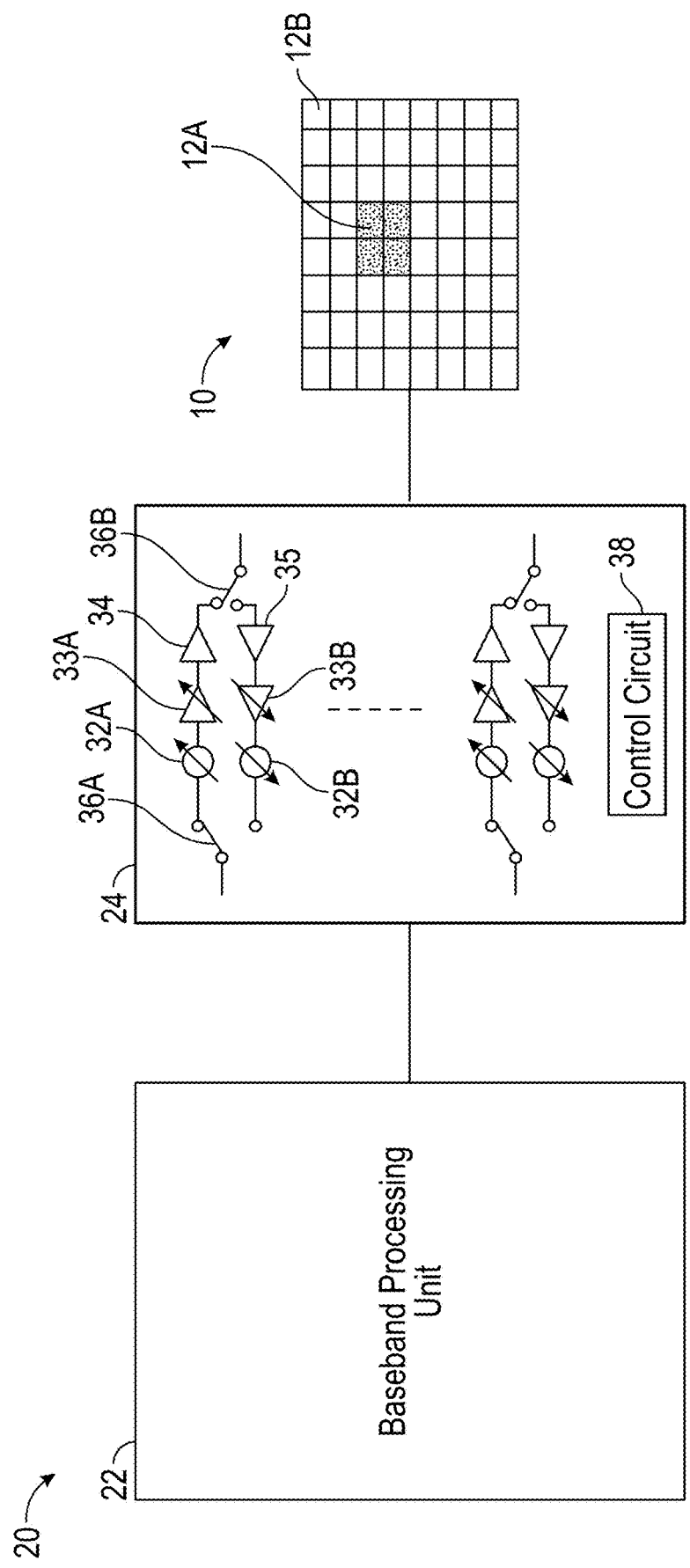
FIG. 1C is a schematic diagram of a wireless communication system that includes the phased antenna array of FIG. 1A according to an embodiment.

FIG. 1C is a schematic diagram of a wireless communication system 20 that includes the phased antenna array 10 of FIG. 1A according to an embodiment. The wireless communication system 20 includes a baseband processing unit 22, a radio frequency front end (RFFE) 24 in communication with the baseband processing unit 22, and the phased antenna array 10. The wireless communication system 20 can be infrastructure of a wireless communication network, such as a cellular network or a wireless local area network (e.g., a Wi-Fi network), for example. In such applications, a base station can include the wireless communication system 20. As another example, the wireless communication system 20 can be included in a wireless mobile device or mobile station.

The baseband processing unit 22 can include one or more processors and memory storing instructions that, when executed by the one or more processors, preforms any suitable baseband processing operations disclosed herein for wireless communications. For example, the baseband processing unit 22 can determine one or more of which antenna elements of the phased antenna array 10 to activate and/or deactivate, a SE for modulation and/or demodulation, an energy per bit level, or one or more other suitable parameters for wireless communication. The baseband processing unit 22 can perform computations associated with any of the equations disclosed herein. The baseband processing unit 22 can make determination(s) based on such computations. The baseband processing unit 22 can be a baseband unit (BBU) of a communications network. The baseband processing unit 22 can be a baseband processor of a mobile station, such as a smart phone, user equipment, or the like.

The RFFE 24 can include a plurality of processing channels each associated with a respective antenna element 12 of the phased antenna array 10. As illustrated, the processing channels each include a transmit path and a receive path. The transmit path can include a phase shifter 32A, an adjustable gain amplifier 33A, and a power amplifier 34. The phase shifter 32A and the adjustable gain amplifier 33A can adjust phase and amplitude, respectively, for transmit beamforming. The power amplifier 34 can amplify a radio frequency signal for transmitting via a respective antenna element 12. The receive path can include a low noise amplifier 35, an adjustable gain amplifier 33B, and a phase shifter 32B. The low noise amplifier 35 can amplify a radio frequency signal received via a respective antenna element 12 for processing by a receive path. The phase shifter 32B and the adjustable gain amplifier 33B can adjust phase and amplitude, respectively, for receive beamforming. The processing channels can each include switches 36A and 36B to selectively electrically couple the transmit path or the receive path to an antenna element 12 and a transceiver.

The RFFE 24 can include a control circuit 38 to selectively activate and/or deactivate antenna elements 12 of the phased antenna array 10. The control circuit 38 can deactivate an antenna element 12 by decoupling circuitry of a respective processing channel and/or deactivating circuitry of the processing channel. For example, the control circuit 38 can provide one or more control signals to turn off the power amplifier 35 and/or to decouple the power amplifier 35 from a respective antenna element 12 using the switch 36B to deactivate the respective antenna element 12. The control circuit 38 can activate an antenna element 12 by coupling circuitry of a respective processing channel and/or activate circuitry of the processing channel. For example, the control circuit 38 can provide one or more control signals to turn on a power amplifier 35 and/or to couple the power amplifier 35 to a respective antenna element 12 using the switch 36B to activate the respective antenna element 12.

Although the control circuit is shown as being part of the RFFE 24 in FIG. 1C, the functionality of the control circuit 38 can be implemented by any suitable circuitry of one or more of the RRFE 24, the baseband processing unit 22, or other circuitry of a wireless communication system.

The control circuit 38 can dynamically activate and/or deactivate antenna elements 12 of the phased antenna array 10 for energy efficient wireless communication. This dynamic adjustment can be in response to detecting a change in range. For example, the baseband processing unit 22 can detect a change in range associated with a link and then cause the control circuit 38 to adjust a number of antenna elements 12 that are active. The control circuit 38 can adjust the number of antenna elements 12 that are active based on one or more environmental conditions, such as interference and/or rain. The control circuit 38 can dynamically adjust the number of antenna elements 12 that are active based on interference associated with a link. More antenna elements 12 can be active when there is a higher level of interference. The interference can be detected by the baseband processing unit 22. The control circuit 38 can adjust the number of antenna elements 12 that are active based on a weather condition, such as rain. With rain, more antenna elements 12 can be activated than without rain. Similarly, in heavier rain, more antenna elements 12 can be active than in lighter rain. In certain applications, rain can be detected based on information provided to the baseband processing unit 22. Such information can be generated by a sensor, a weather reporting service, or in any other suitable manner.

Power consumption of circuitry of wireless communications systems will now be discussed. The circuit power Pc in the Equation 12 can be assumed to be a constant. However, both analog and digital circuit power consumption can scale with both bandwidth and dynamic range. Such scaling can be modeled by assuming that circuit power Pc is made up of three parts, converter/analog/radio frequency power Pca, digital power Pcd, and minimum power at low SNR and for digital leakage P0. Equations 17-19 are provided for circuit power and the analog and digital components.

$$Pc = Pca + Pcd + Po \quad \text{(Equation 17)}$$

$$Pca = ka * (2^{SE} - 1) * BW \quad \text{(Equation 18)}$$

$$Pcd = kd * (SE + 1)^2 * BW \quad \text{(Equation 19)}$$

Equation 19 for digital circuit power Pcd differs from a typical assumption for digital circuit power Pcd being proportional to the Log (SE) because such an approximation is not accurate for SE less than or equal to one. Equation 19 can work well for all SE values.

In Equations 17-19, ka, kd, and P0 are empirical parameters and can be approximated as: ka=1e-13, kd=1e-12, Po=20e-3.

Figure 2:
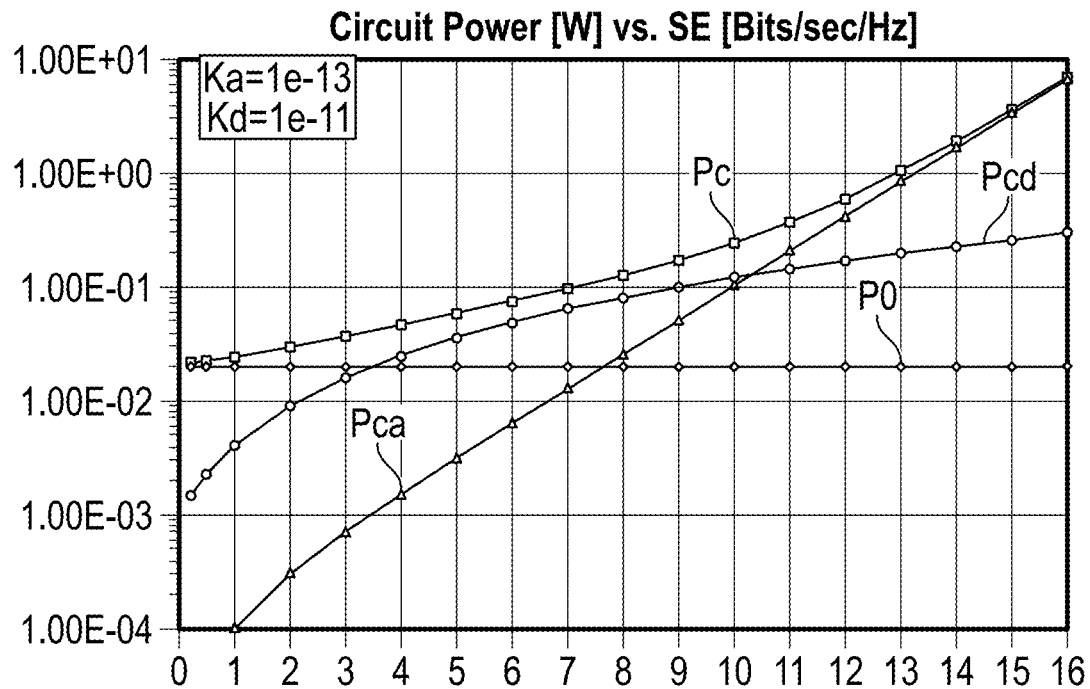
FIG. 2 is a plot of circuit power and components of circuit power versus spectral efficiency.

FIG. 2 is a plot of circuit power Pc for a 1 GHz BW and component of circuit power Pc as SE is increased. Circuit power Pc ranges from 20 milliwatts (mW) for small SE and increases to 100 to 200 mW for SE values of 7 to 9. Then circuit power Pc increases to several watts with larger SE values primarily driven by high-dynamic analog/mixed-signal processing. The values of ka, kd, and Po associated with FIG. 2 are representative and a function of technology choices.

Figure 3:
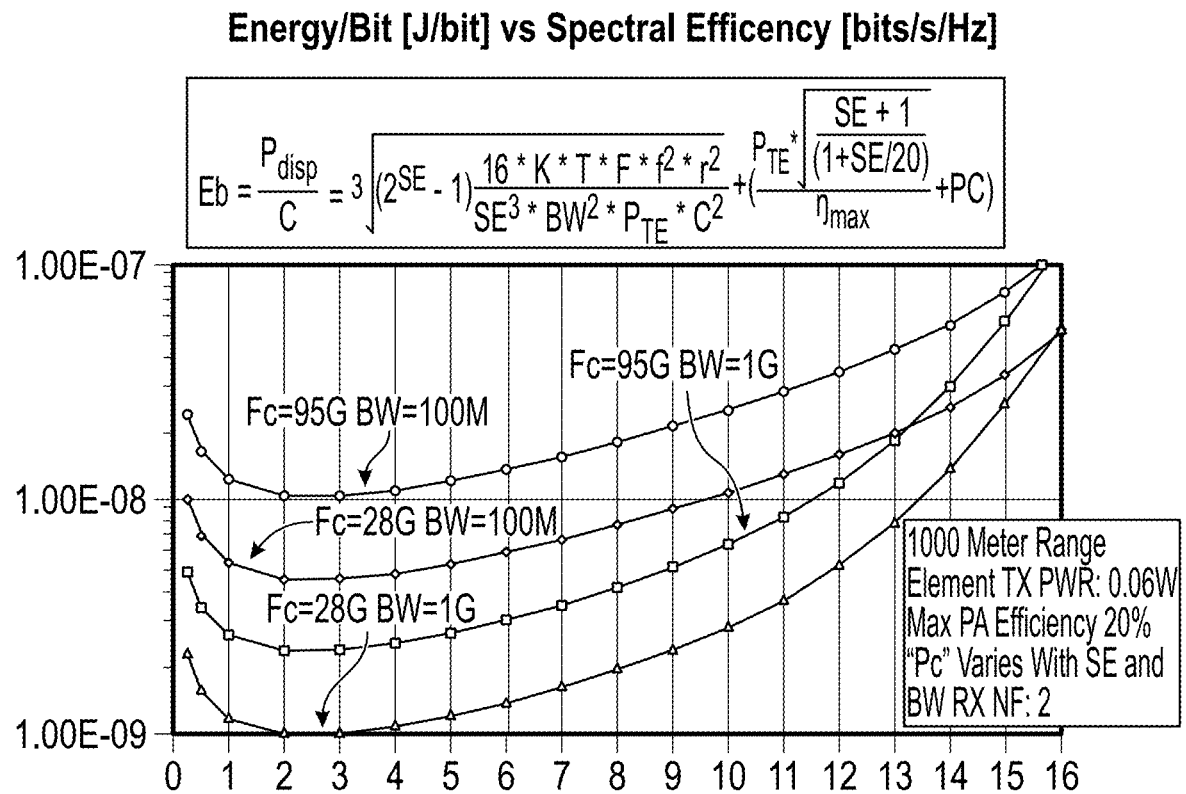
FIG. 3 is a graph of energy per bit versus spectral efficiency for several different bandwidths and center frequencies.

FIG. 3 is a graph of energy per bit Eb is plotted versus SE for several different bandwidths and center frequencies. These graphs indicate that there is a SE that provides a lowest energy per bit Eb when SE is around 2. Energy per bit Eb its fairly flat for SE between 1 and 4 in FIG. 3. The graphs in FIG. 3 indicate that optimal power efficiency can be achieved with SE in a range from about 2 and 4 bits/s/Hz independent of bandwidth and center frequency. Implicit in FIG. 3 is that as SE is increased, the number of elements also increases since power per element is fixed. The graph of FIG. 3 indicates that SE in a range from 1 to 4 can be desirable for energy efficient wireless communications. A SE in a range from 1 to 6 can be lead to more efficient wireless communication than in higher SE communications, such as certain multiple-input multiple-output (MIMO) communications under the Long Term Evolution (LTE) standard. The power amplifier efficiency can vary significantly. The relationship shown in FIG. 3 can apply to a variety of power amplifier efficiencies.

Figure 4A:
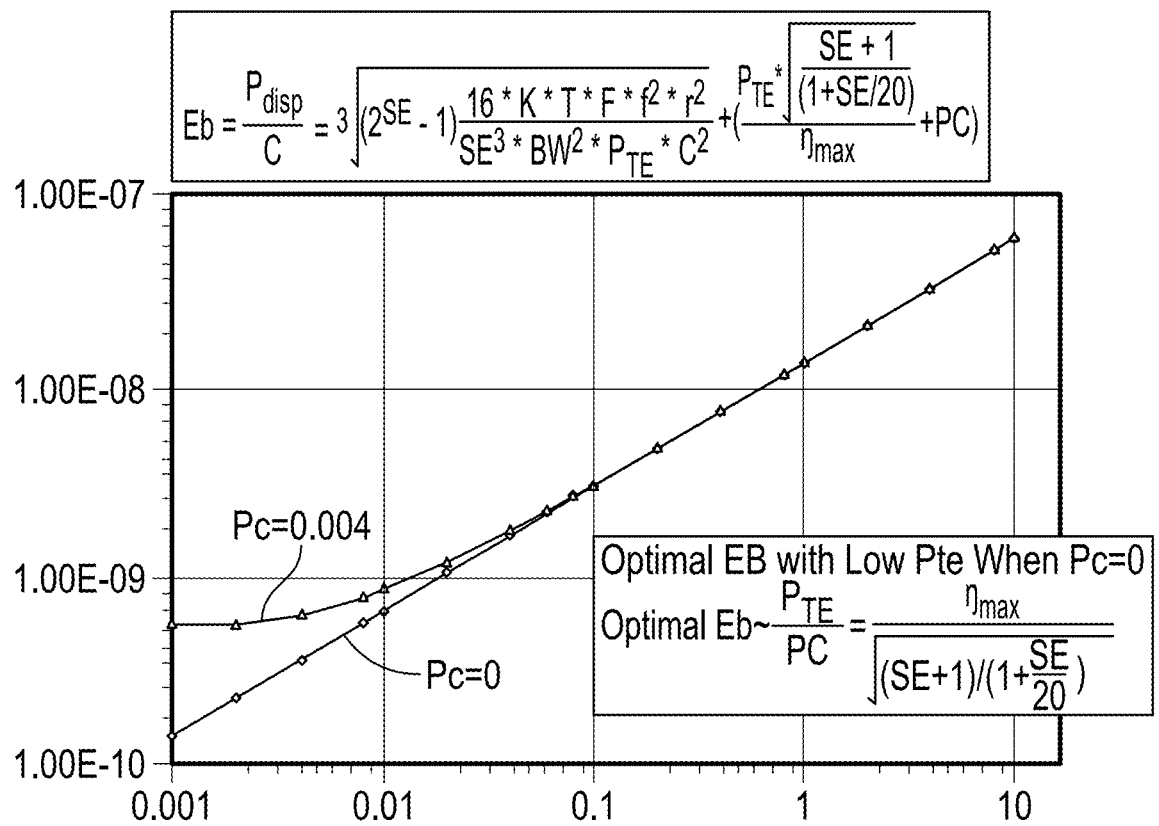
FIG. 4A is a graph of energy per bit versus element transmitting power for several circuit power conditions.
Figure 4B:
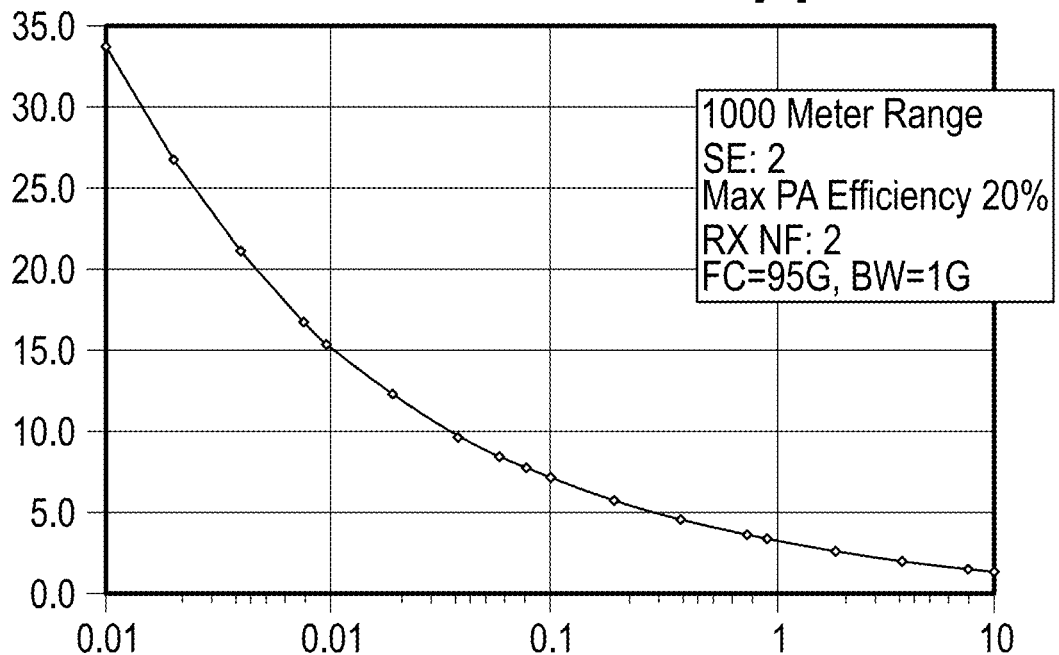
FIG. 4B is a graph of number of transmitting elements versus power.
Figure 4C:
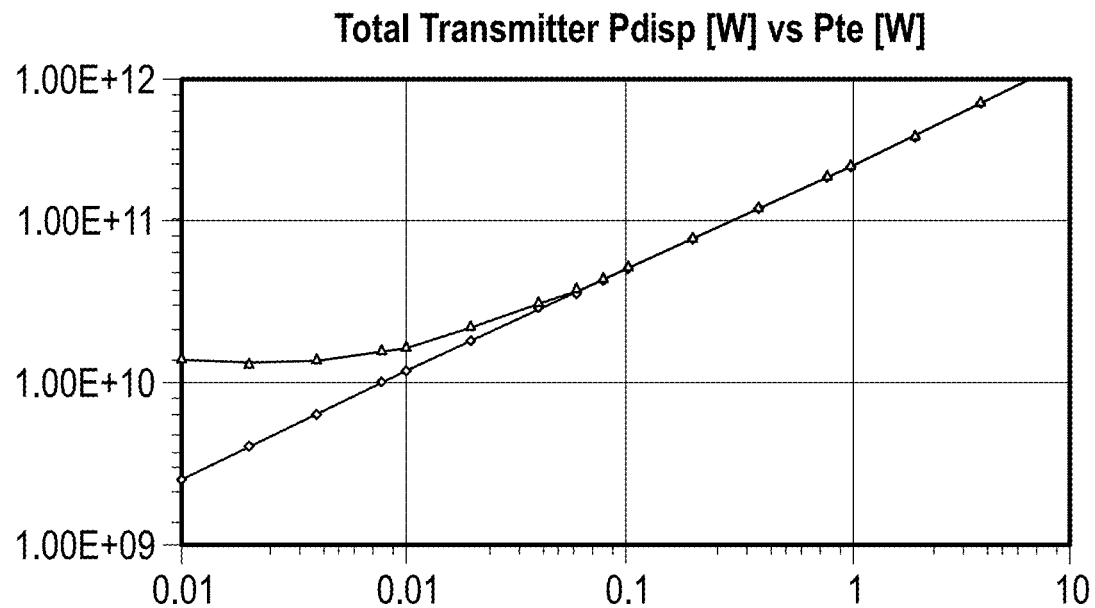
FIG. 4C is a graph of total transmitter power dissipation.

FIG. 4A is a graph of energy per bit Eb versus element transmitting power $P_{TE}$ for several circuit power Pc conditions. FIG. 4B is a graph of number of transmitting elements versus element transmitting power $P_{TE}$. FIG. 4C is a graph of total transmitter power dissipation Pdisp. When circuit power Pc=0, energy per bit Eb drops toward zero as element transmitting power $P_{TE}$ also drops toward zero.

For a non-zero circuit power Pc, there is an optimal element transmitting power $P_{TE}$ and the ratio can be given by:

$$\frac{PTE}{Pc} = \frac{\eta \max}{\sqrt{1 + \frac{SE}{20}}} \quad \text{(Equation 20)}$$

This result shows that low energy communications systems can favor low transmit power arrays with a relatively large number of elements. Arrays using this principle can have relatively low heat density. Air-cooling can be possible, which will further improve energy consumption.

The optimal energy per bit Eb relationship between element transmitter power $P_{TE}$ and circuit power Pc is unexpected, especially the relatively low optimal transmit power. For example, when circuit power Pc=0.024 Watts (W) and with a power amplifier max efficiency of 0.2, then the element transmit power $P_{TE}$ is optimal at ~0.002 W and power amplifier power dissipation is 0.017 W. This result is not what is expected or typically assumed—optimal power amplifier power dissipation less than the circuit power.

Figure 5:
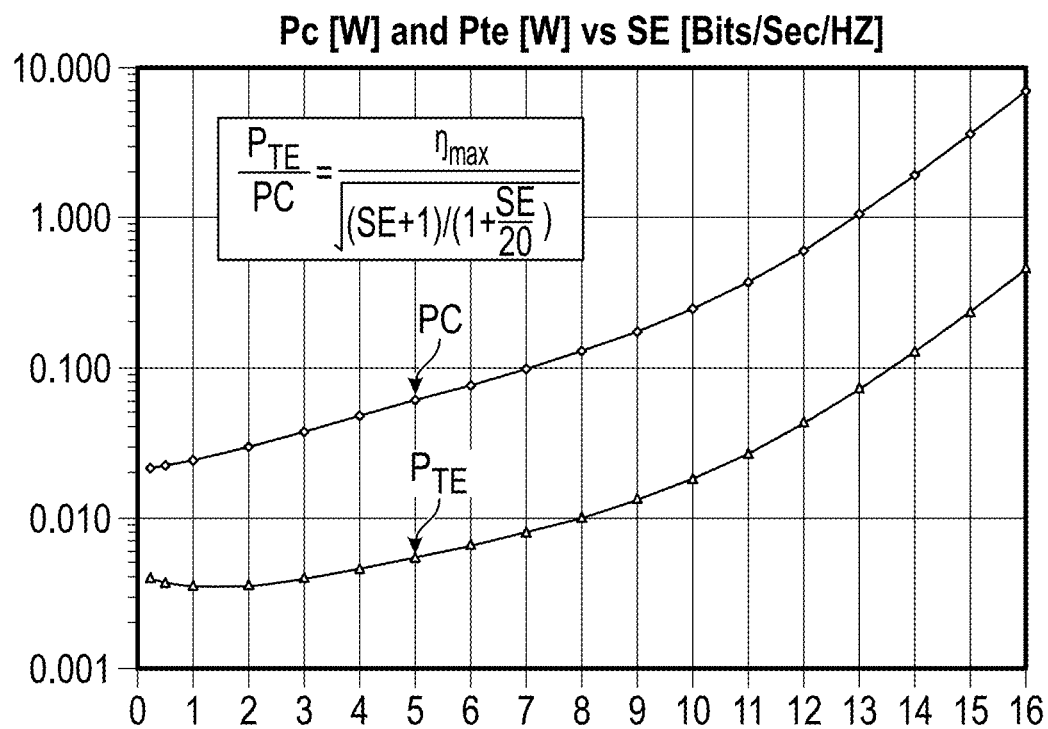
FIG. 5 is a graph of circuit power and element transmitter power versus spectral efficiency.

The dependency of circuit power Pc and element transmitter power $P_{TE}$ VS spectral efficiency is shown in FIG. 5 with center frequency=95 GHz, BW=1 GHz, and max power amplifier efficiency of 20%. The low optimal transmit power compared to circuit power is a result of the low power amplifier efficiency assumed and transmit power increases with power amplifier efficiency and should also increase if power amplifier efficiency at backoff can be improved.

To summarize, there are several independent parameters that can result in low power and when applied together can provide for an optimally low power communications link.

First, a low SE modulation with an SE in a range from 1 to 6 can be used. The SE can be in a range from 1 to 4. The Low SE can improve efficiency due to the reduced SNR specifications and due to the reduced power amplifier PAPR. As the number of active antenna elements of a phase antenna array changes, the SE can be maintained within this range. For example, with reference to FIG. 1C, as the control circuit 38 can adjust the number of active antenna elements and SE can be maintained in a range from 1 to 6, such as within a range from 1 to 4. At the same time, PAPR can be maintained within a range from 0 dB to 6 dB, such as within a range from 0 dB to 4 dB or within a range from 0 dB to 3 dB. The baseband processing unit 22 of FIG. 1C can determine and/or implement a SE modulation that is maintained for communications in the wireless communication system 20. The baseband processing unit 22 of FIG. 1C can determine and/or implement the parameters for PAPR that are maintained for communications in the wireless communication system 20.

Second, using a relatively large BW and a relatively small center frequency Fc, which can result in a (large fractional bandwidth of BW/Fc. Scaling to higher frequencies may provide no significant reduction in efficiency when BW is also scaled.

Links can have relatively high operating frequencies or center frequencies for efficient wireless communications with phased antenna arrays disclosed herein. In certain applications, such a link can have an operating frequency that is at a radio frequency above Frequency Range 2 (FR2) defined in a fifth generation (5G) New Radio (NR) specification. For example, the link can have an operating frequency in a range from 90 GHz to 300 GHz. The link can have an operating frequency in a range from 90 GHz to 200 GHz. More bandwidth can be available at higher operating frequencies compared to operating frequencies below 7 GHz. The link can have a relatively large bandwidth. For example, the bandwidth of the link can be at least 0.25 GHz, 0.5 GHz, 1 GHZ, 2 GHZ, or 5 GHz. The link can have a bandwidth of 10 GHz or less. The link can have a bandwidth in a range from any one of the bandwidths in the two preceding sentences to any other bandwidth in the two preceding sentences. The combination of link operating frequency and fractional bandwidth together with low SE can result in efficient wireless communications.

Third, element transmitter power $P_{TE}$ with circuit power Pc, SE, and power amplifier efficiency can be set based on Equation 20. In certain applications, the baseband processing unit 22 of the wireless communication system 20 of FIG. 1C can set these parameters based on this equation. The result of Equation 20 is unexpected and appears to go against conventional wisdom of a high power amplifier power per element.

Fourth, a number of active elements for a particular range can be set based on Equation 12. In certain applications, the baseband processing unit 22 of FIG. 1C can determine the number of active elements. The baseband processing unit 22 can provide one or more signals to the control circuit 38 to activate and/or deactivate elements accordingly.

These design parameters can be used to design an optimal array where the number of elements is scaled with range. The link can transmit at a generally constant rate of SE*BW bits per second (BPS) and shut off when no data is needed, or the link can be directed at other users (e.g., based on time division duplexing). The bit rate can be at least 0.5 gigabits per second (GBPS), 1 GBPS, 2 GBPS, or 5 GBPS. The bit range can be less than 10 GBPS. The bit rate can be in a range from one of the bit rates in the two preceding sentences to another bit rate in the two preceding sentences.

Figure 6A:
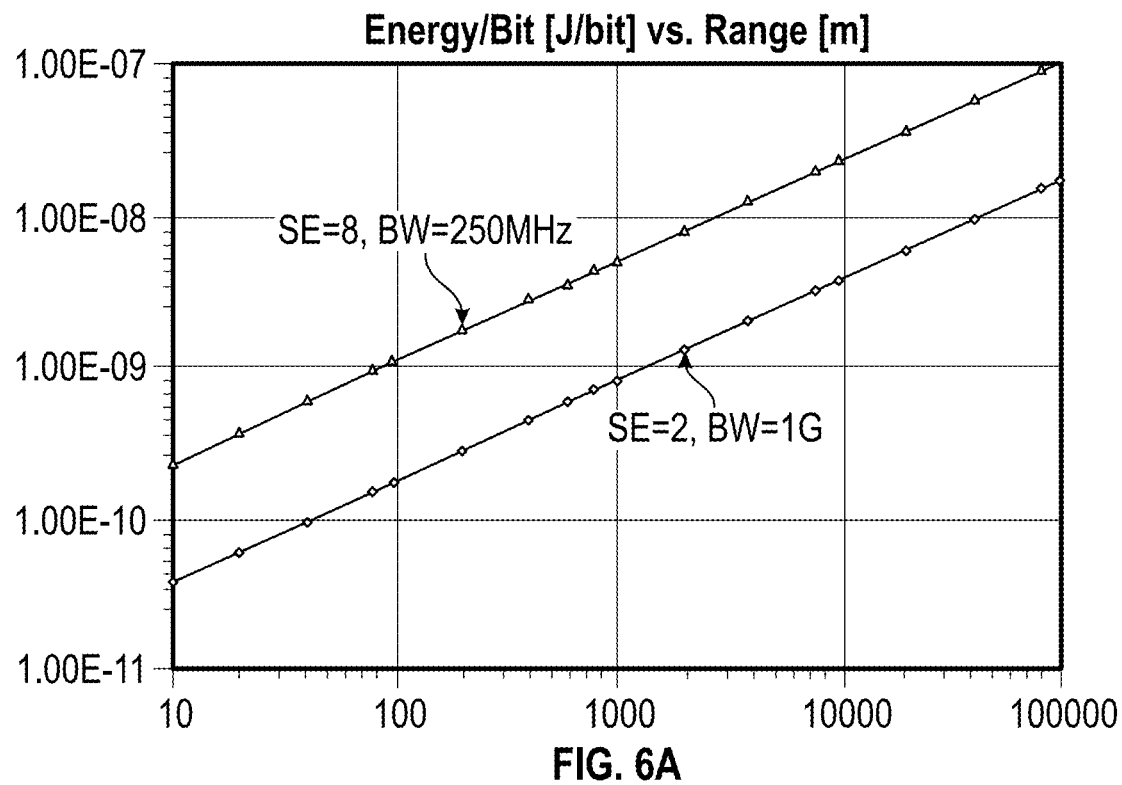
FIGS. 6A, 6B, and 6C are graphs comparing two links at 95 GHz with a 2 gigabits per second (GBPS) capacity.
Figure 6B:
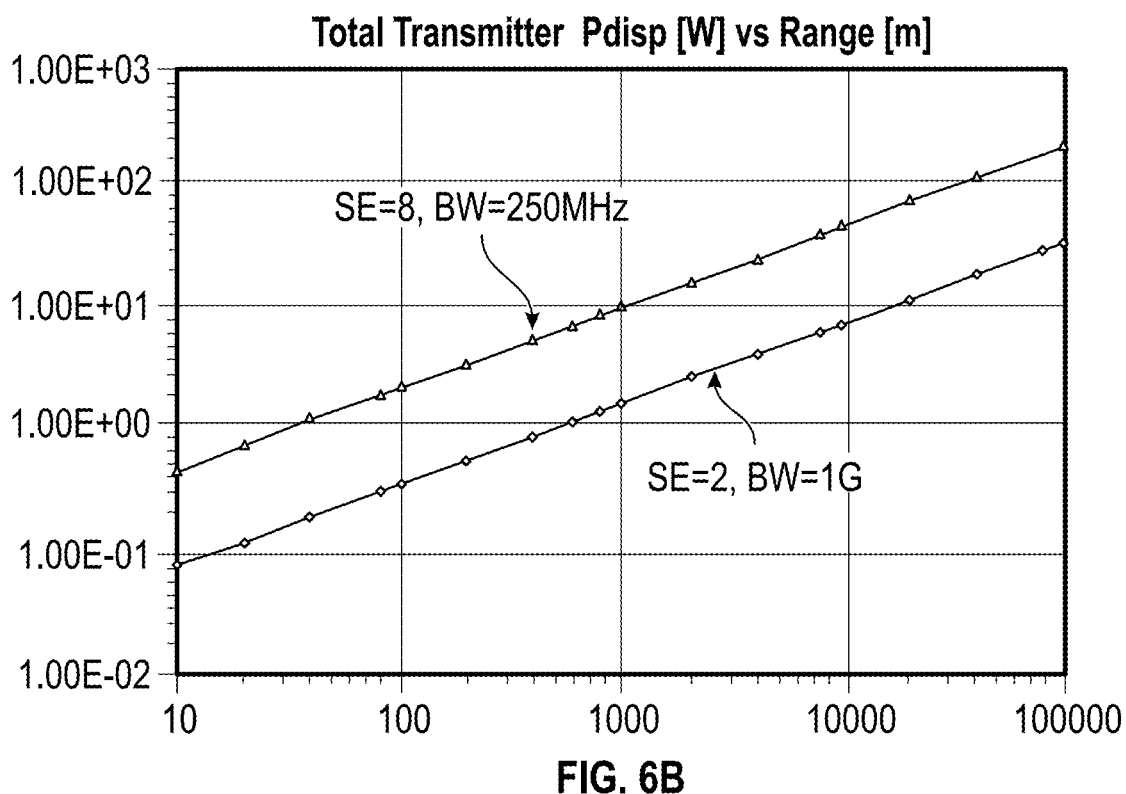
Figure 6C:
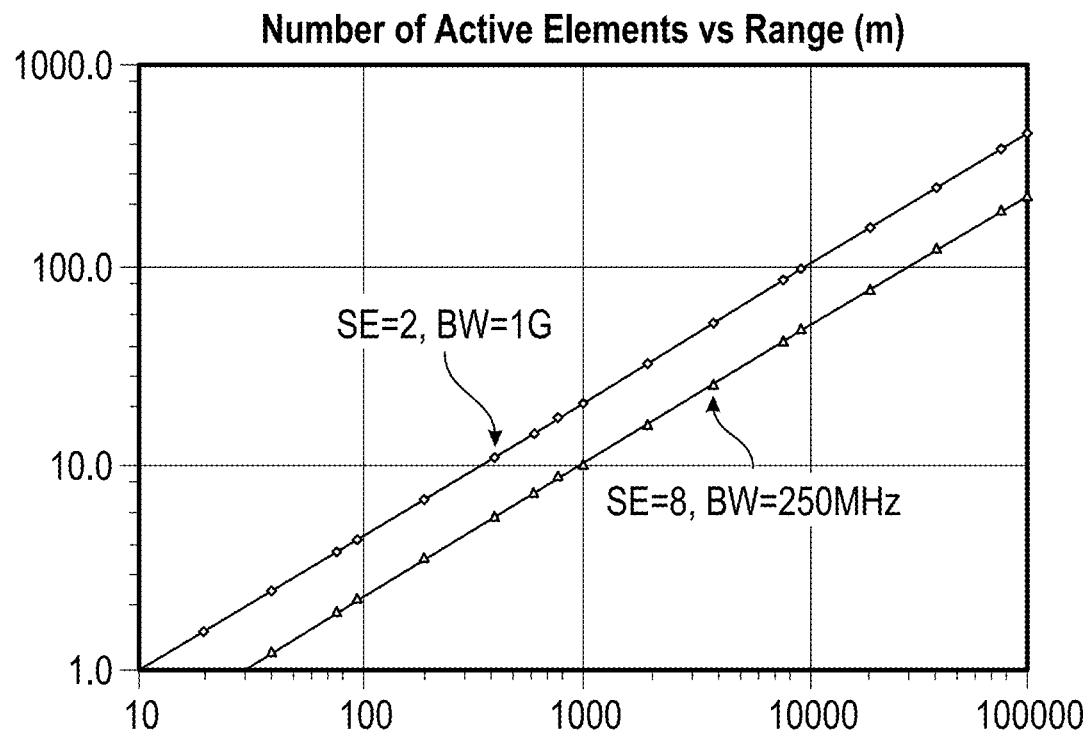

FIGS. 6A, 6B, and 6C are graphs comparing two links at 95 GHz with a 2 GBPS capacity. A first link has a 1 GHz bandwidth and a SE of 2. A second link has a 250 megahertz (MHz) bandwidth and SE of 8. The graphs of FIGS. 6A, 6B, and 6C show how energy per bits Eb, number of active elements n, and transmitter power $P_{TE}$, respectively, scale with range for the first and second links. Energy per bit Eb is lower by 7× for the first link with a lower SE and wider bandwidth than the second link, while providing the same capacity. Reducing and/or minimizing circuit Pc and increasing power amplifier efficiency at backoff can be significant to reducing energy specifications.

The adaptive communications link as described for optimal energy using a phased antenna array where elements can be switched on/off involves the ability to turn the power amplifiers on/off relatively quickly. For traditional, high-power power amplifier, this could be a challenge. However, for arrays where power amplifier power is modest, turning power amplifier on/off quickly is not a significant issue. Also, low power amplifier power and power density would result in a reduction or even elimination of active cooling resulting in additional energy and cost savings.

Figure 7:
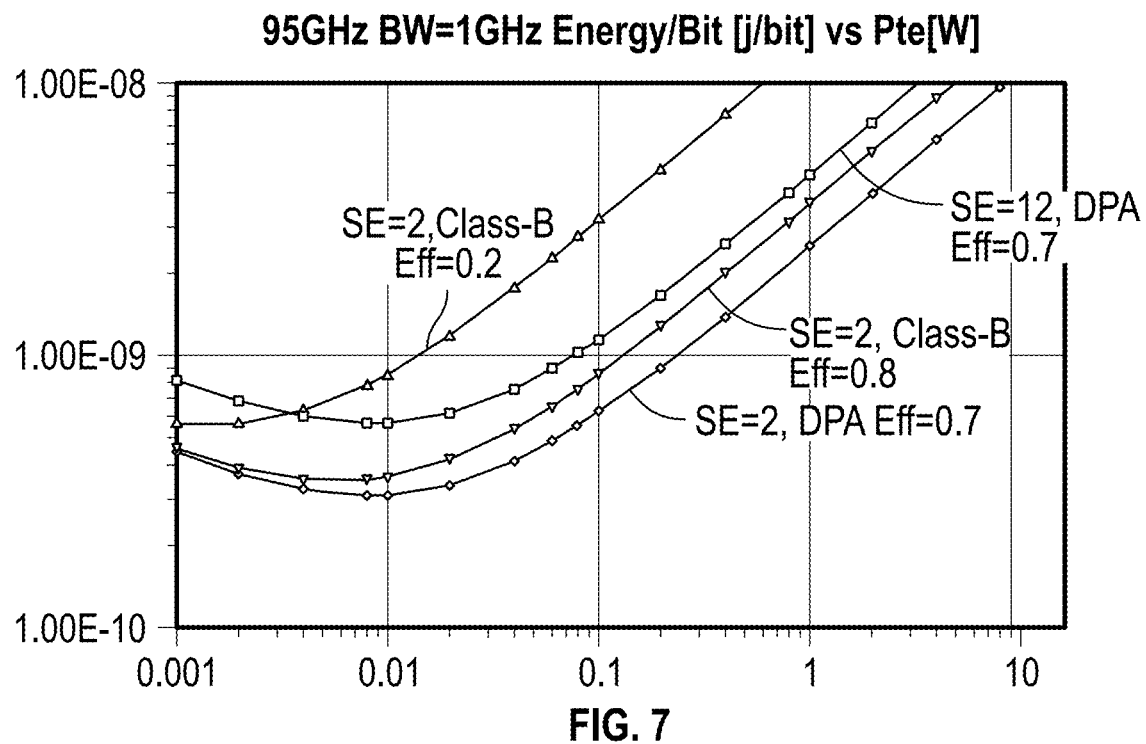
FIG. 7 includes a graph for a 95 GHz link comparing energy per bit for various spectral efficiencies and power amplifier types.

FIG. 7 includes a graph for a 95 GHz link comparing energy per bit Eb for various SE modulations and power amplifier types. The analysis above shows that optimal energy is at low per element transmit power Pte. This is counter to conventional wisdom. The plots in FIG. 7 can provide insight into low SE and power amplifier type impact power consumption.

FIG. 7 indicates that when power amplifier maximum efficiency is higher, then element transmitting power moves from 2 mW to 8 mW while energy per bit Eb drops from 550 pJ/b down to 350 pJ/b. Accordingly, improvement in power amplifier efficiency can result in a higher optimal power per transmitter element Pte and a lower energy per bit Eb.

FIG. 7 also shows curves for a Doherty PA (DPA) with a 70% efficiency, which stays relatively constant with PAPR and hence with SE. In the two cases plotted (SE=2 and SE=12), the optimal power amplifier power for the DPA is still relatively low, 8 to 10 mW per element, compared to conventional wisdom.

Example Adaptive Phased Antenna Array

Figure 8:
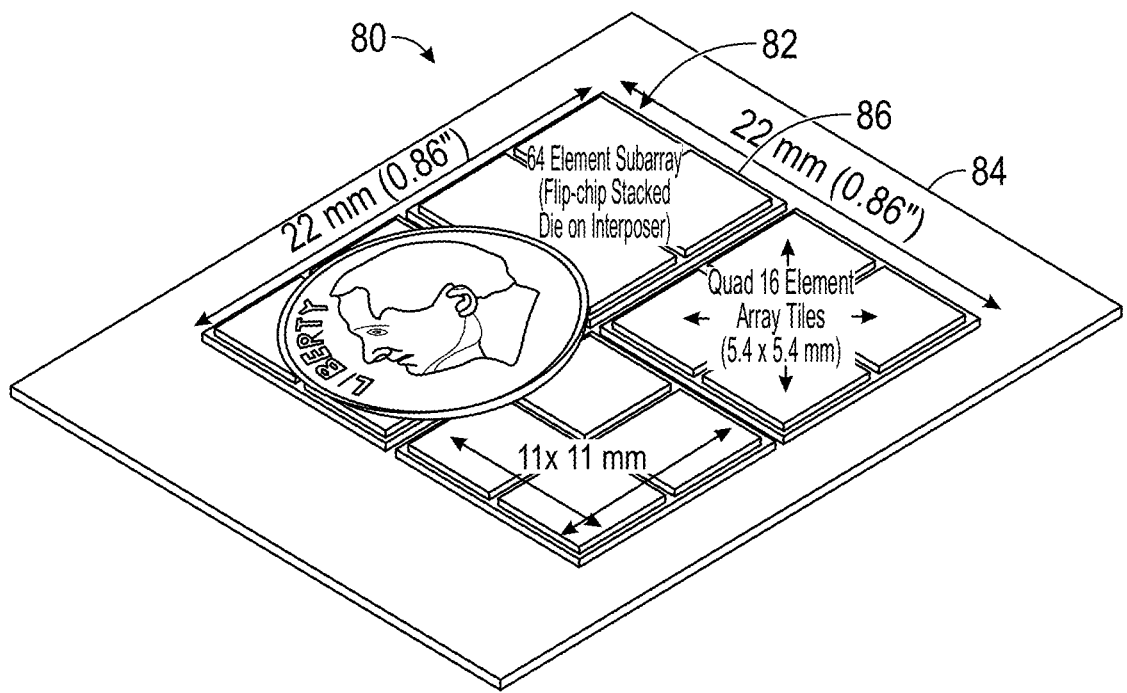
FIG. 8 illustrates an example phased antenna array according to an embodiment.

FIG. 8 illustrates an example phased antenna array 80. A dime is also illustrated next to the phased antenna array 80 for scale. As illustrated, the phased antenna array 80 can include four antenna element subarrays 82. The antenna element subarrays 82 can on be flip-chip stacked dies on an interposer 84. Each antenna element subarray 82 can include quad antenna array tiles 86. The phased antenna array 80 can dynamically activate and/or deactivate antenna elements in accordance with any suitable principles and advantages disclosed herein.

Using the analysis above, the phase antenna array 80 can be constructed to include 256 antenna elements and operate at 95 GHz with a 1 GHz bandwidth in certain applications. In such applications, SE=2 can be chosen and can result in a capacity of 2 GBPS. The phased antenna array 80 can have a transmitter element power Pte of 5 m W assuming a power amplifier efficiency of 20%. The circuit power Pc can be 40 mW and the total power dissipated per element can be 80 m W in this example, which can result in a maximum power dissipation of around 20.6 Watts.

As shown in FIG. 8, the phased antenna array 80 can be small. For example, as illustrated, the phased antenna array 80 can have an area of 22 mm×22 mm, resulting in a packaged component with dimensions of less than 1 inch×1 inch. As mentioned above, a dime is illustrated in FIG. 8 to show the scale of the example phased antenna element array 80.

Figure 9:
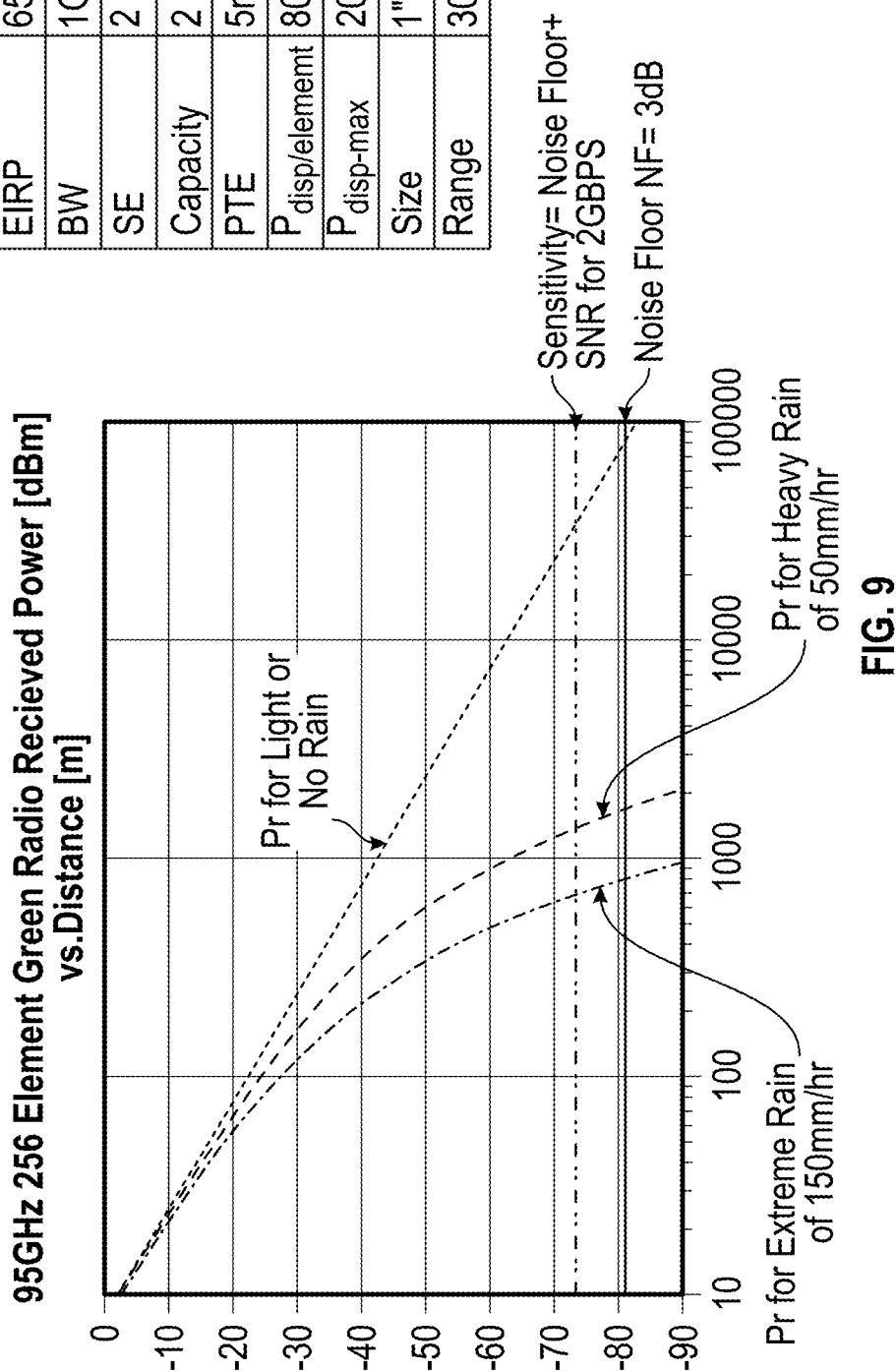
FIG. 9 is a graph that includes receiver power versus range curves for the phased antenna array of FIG. 8 under different weather conditions.

FIG. 9 is a graph that includes receiver power Pr versus range curves for performance of the example phased antenna element array 70 under different weather conditions. The simulations were for the example phased antenna element array 70 with 256 antenna elements operating at 95 GHz with a 1 GHz BW and SE=2. This example phased antenna element array 70 can provide a link with a 2 GBPS rate. The range can be 30 km in a clear line of sight environment. Rain can limit range due to signal attenuation. In heavy rain of 50 millimeters per hour, range can be limited to about 1.5 km. Range can be limited to 700 meters in extreme rain of 150 millimeters per hour.

A radio with the example phased antenna element array 70 can be advantageous in for applications at the intelligent edge where remote sensors can be efficiently interconnected and a common radio can be used and then adjusted for range by enabling elements as desired.

Non-Symmetric Arrays

Equations above for array scaling (number of active elements) and energy per bit Eb were derived assuming equal array sizes for transmitting and receiving. In this section, unequally sized arrays are analyzed. Non-symmetric arrays between transmit and receive can occur where one side of the link has a significant size constraint and/or there is a desire to reduce and/or optimize energy for one side of the link due to non-symmetric energy specifications. In this section, receive power is analyze and the per element receive power is assumed to be is equal to circuit power Pc or the circuit power similar to the transmit circuit power. This can a reasonable assumption since circuit dynamic range and bandwidth can be nearly the same for transmitters and receivers.

Equation 11 relates to the number of elements in the transmitter and receiver to deliver bits at a given rate over a given range. Many combinations of transmit elements nt and receive elements nr can satisfy Equation 11. Power consumption for these cases will be analyzed. We start by assuming n=nt=q*nr where q is the ratio between the transmit array and receive array element number. Equation 11 then can be solved for n:

$$n = nt = q*nr = \sqrt[3]{(2^{SE}-1)\frac{16*q*k*T*F*BW*f^2*r^2}{P_{TE}*c^2}} \quad \text{(Equation 21)}$$

Total power dissipation Pdisp for both transmit and receive is then given by:

$$P_{disp} = nt*\left(\frac{P_{TE}}{\eta}+Pc\right)+nr*Pc \quad \text{(Equation 22)}$$

$$P_{disp} = n*\left(\frac{P_{TE}}{\eta}+Pc\right)+n/q*Pc = n*\left(\frac{P_{TE}}{\eta}+(1+1/q)*Pc\right) \quad \text{(Equation 23)}$$

Substituting for n in the above equation results in:

(Equation 24)

$$P_{disp} = \sqrt[3]{(2^{SE}-1)\frac{16*q*k*T*F*BW*f^2*r^2}{P_{TE}*c^2}} * \left(\frac{P_{TE}*\sqrt{\frac{SE+1}{\left(1+\frac{SE}{20}\right)}}}{\eta_{max}}+(1+1/q)*Pc\right)$$

The modified energy per bit Eb is then:

(Equation 25)

$$Eb = \frac{P_{disp}}{C} = \sqrt[3]{(2^{SE}-1)\frac{16*q*k*T*F*f^2*r^2}{SE^3*BW^2*P_{TE}*c^2}} *$$

$$\left(\frac{P_{TE} * \sqrt{\frac{SE+1}{\left(1+\frac{SE}{20}\right)}}}{\eta_{max}} + (1+1/q)*Pc\right) \quad 5$$

Figure 10:
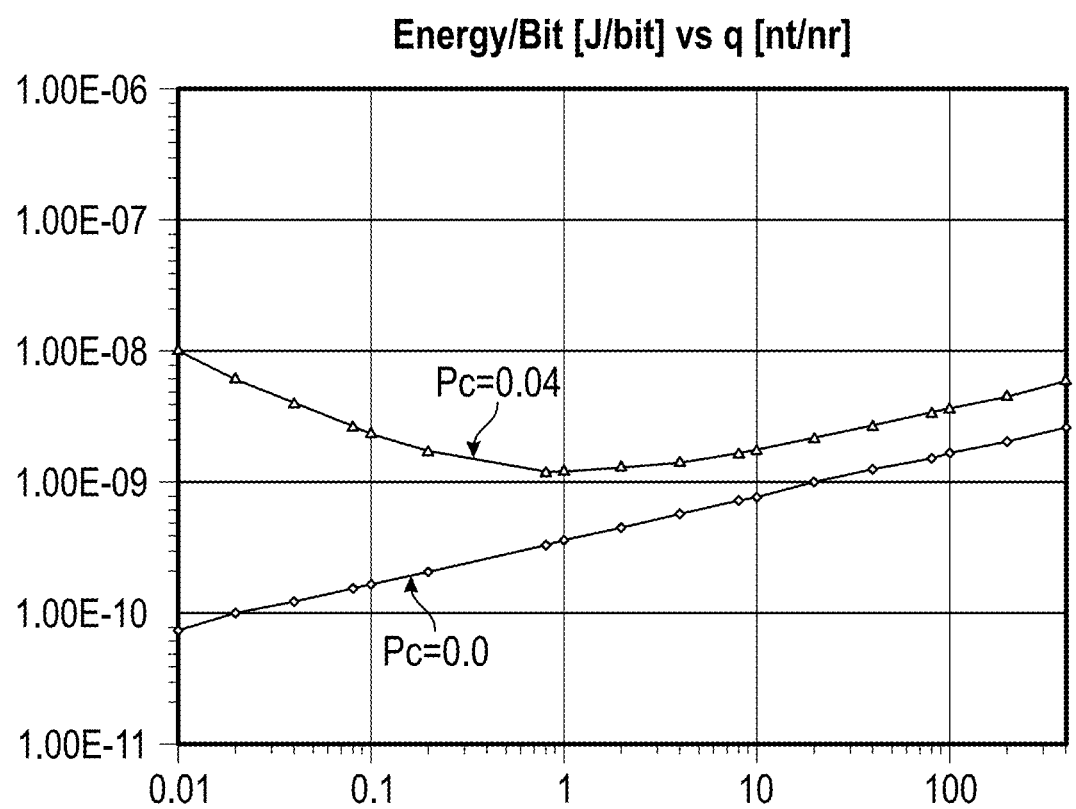
FIG. 10 is a graph of energy per bit versus an element ratio of transmit elements over receive elements.

In Equation 25, the additional factor q and 1+q are included. The above expression can be plotted vs. q as shown in FIG. 10. Eb is plotted for two cases, when circuit power Pc=0 and when circuit power Pc=0.04 at a range of 1000 meters. When circuit power Pc is zero, optimum energy is for an array with a very large receiver and minimal sized transmitter since in this case receive array is energy free. In a more realistic case, where circuit power Pc in not zero, then minimum energy occurs approximately when the transmit and receive arrays are the same size (q=1).

Figure 11A:
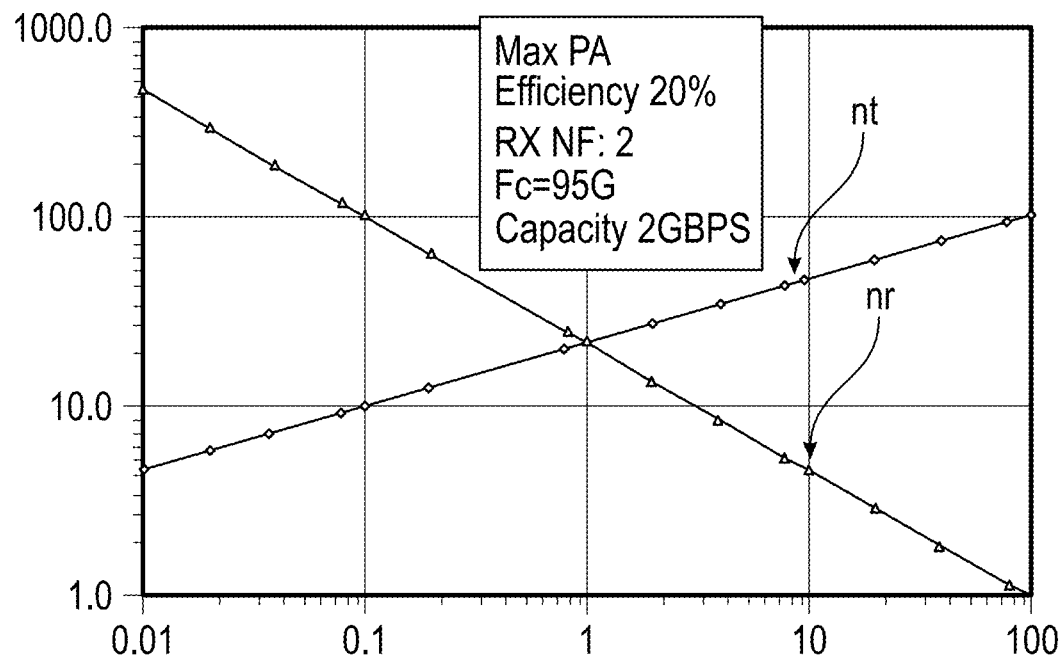
FIG. 11A is a graph with plots of the number of elements for transmit and receive vs. element ratio for a range of 1000 meters.
Figure 11B:
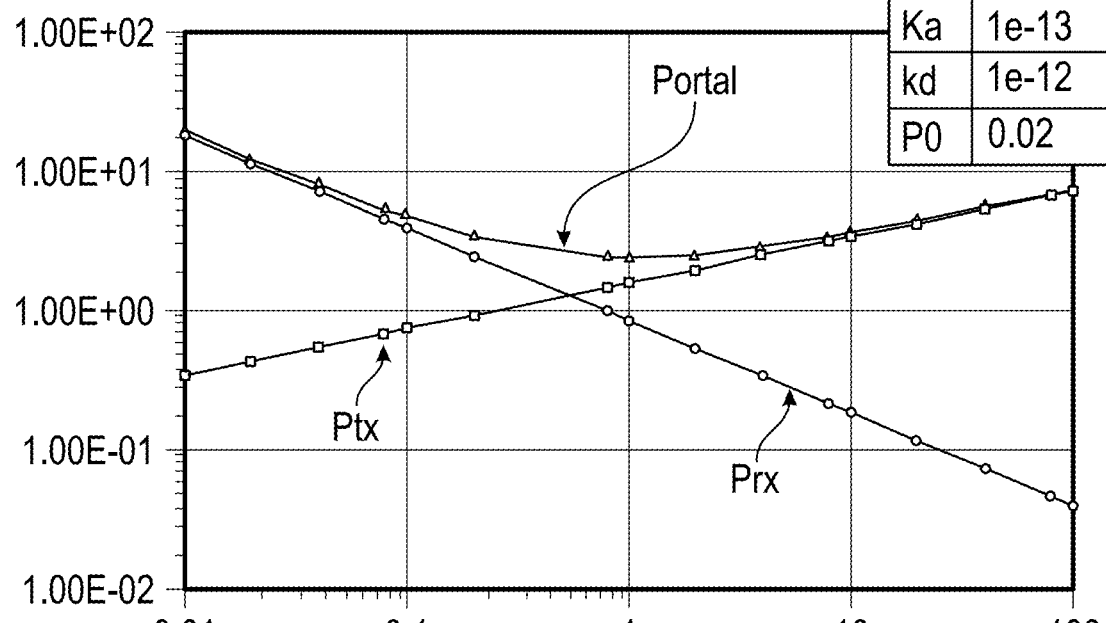
FIG. 11B is graph with plots that show how transmit power, receive power, and total power vary with element ratio.

FIG. 11A is a graph with plots of the number of elements for transmit and receive vs. q for a range of 1000 meters. FIG. 11B is graph with plots of that shows how transmit power, receive power, and total power vary with element ratio q. This graph indicates that the optimal point for minimizing total energy can be achieved by using transmit and receive arrays of equal size.

Although symmetric arrays where transmit and receive arrays are the same size can result in lowest total energy, there are cases when design specifications are more concerned about energy consumption on one side of the link for both transmit and receive.

FIG. 12 includes tables comparing power consumption for wireless communications between a mobile station (MS) and base station (BS) with different numbers of antenna elements used. In FIG. 12, the top table is for a non-symmetric link where there are different numbers of active antenna elements for transmit than for receive and the bottom table is for a symmetric link with the same number of active antenna elements for transmit and receive. In the top table of FIG. 12, the energy is minimized for the MS by using few elements at the expenses of higher energy consumption by the BS and higher total energy compared to a link with symmetric antenna arrays in the MS and BS. The bottom table in FIG. 12 shows lower total power consumption but higher power consumption at the MS.

Impact of Rain on Array Performance

In certain analysis above, free space transmission where the radio frequency energy spreads out over distance is considered. However, there can be additional loss due to rain and/or one or more other environmental factors. Losses due to rain can become noticeable at 1 GHz, increase sharply with frequency up to 50 to 100 GHz, and then flatten out for higher frequencies. Losses can also so increase with rain rate, which can be measured in millimeters per hour (mm/hr). Rain rate typically exceeds 14 mm/hr only around 1% of the time worldwide and stays below 50 mm/hr around 99.7% of the time. In addition to rain, haze, fog, and clouds can also attenuate radio frequency signals.

Rain loss in decibels per kilometer (dB/km) will now be considered as a function of frequency and rain rate. This attenuation can be given as a (rr,f) dB/m, where rr is the rain-rate and f is the operating frequency.

Equation 4 can be modified to include the loss due to rain as:

$$P_r = \frac{P_T * A_r * A_t * f^2}{r^2 * c^2 * 10^{0.1*\alpha(rr,f)*r}} \quad \text{(Equation 26)}$$

The added term, $10^{\alpha(rr,f)*r}$, can also be included in Equation 6, resulting in:

$$E_b = (2^{SE} - 1)\frac{k*T*F*c^2*r^2*10^{0.1*\alpha(rr,f)*r}}{SE*A_r*A_t*f^2} \quad \text{(Equation 27)}$$

This indicates that when α(rr,f)*r>>1, rain can result in an exponentially increasing energy consumption.

Equation 12 for the number of active elements and Equation 16 for energy per bit can also be modified to include the impact of rain loss:

$$n = \sqrt[3]{(2^{SE} - 1)\frac{16*k*T*F*BW*f^2*r^2*10^{0.1*\alpha(rr,f)*r}}{P_{TE}*c^2}} \quad \text{(Equation 28)}$$

(Eq. 29)

$$Eb = \frac{P_{disp}}{C} = \sqrt[3]{(2^{SE} - 1)\frac{16*k*T*F*f^2*r^2*10^{0.1*\alpha(rr,f)*r}}{SE^3*BW^2*P_{TE}*c^2}} *$$

$$\left(\frac{P_{TE} * \sqrt{\frac{SE+1}{\left(1+\frac{SE}{20}\right)}}}{\eta_{max}} + 2*Pc\right)$$

Figure 13:
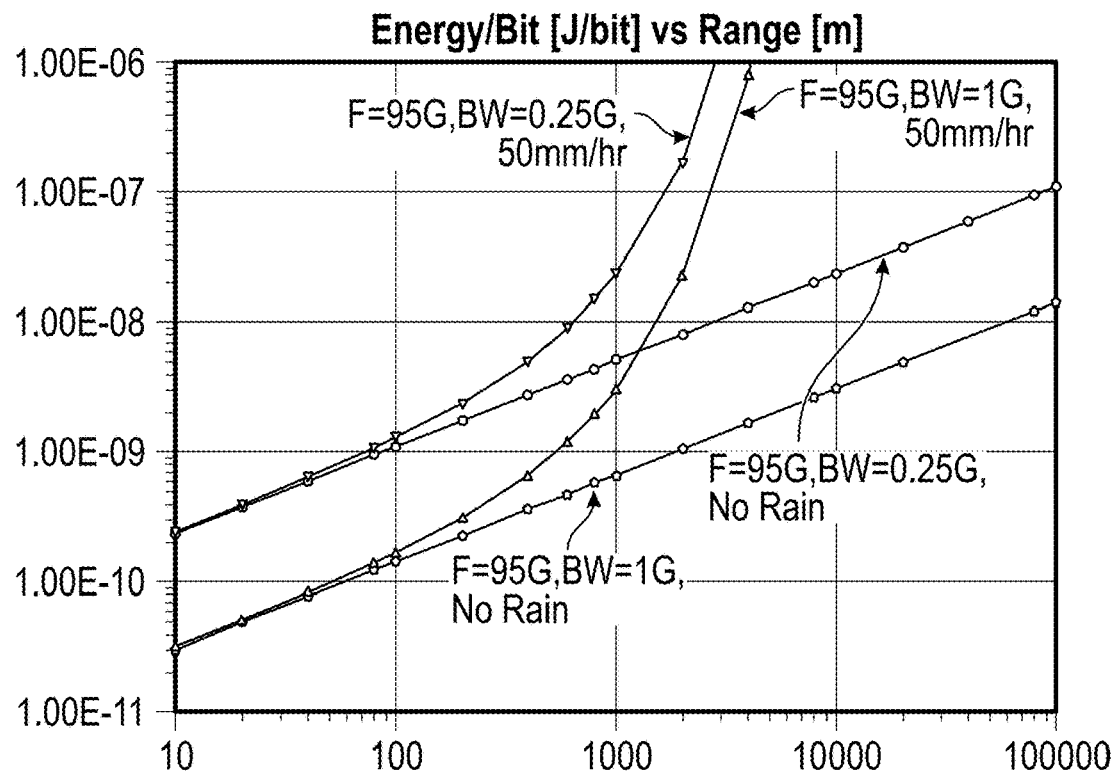
FIG. 13 is a graph with plots of energy per bit versus range for a 2 GBPS 95 GHz link with and without rain.

FIG. 13 is a graph with plots of energy per bit versus range for a 2 GBPS 95 GHz link with and without rain. The plots of energy per bit with and without rain for two different bandwidths (1 GHz and 0.25 GHz) are shown in FIG. 13. With a rain rate of 50 mm/hr, the attenuation due to rain is roughly 20 dB/km. The impact becomes significant around 100 meters and grows rapidly for ranges greater than about 1 km in the plots of FIG. 13.

Figure 14:
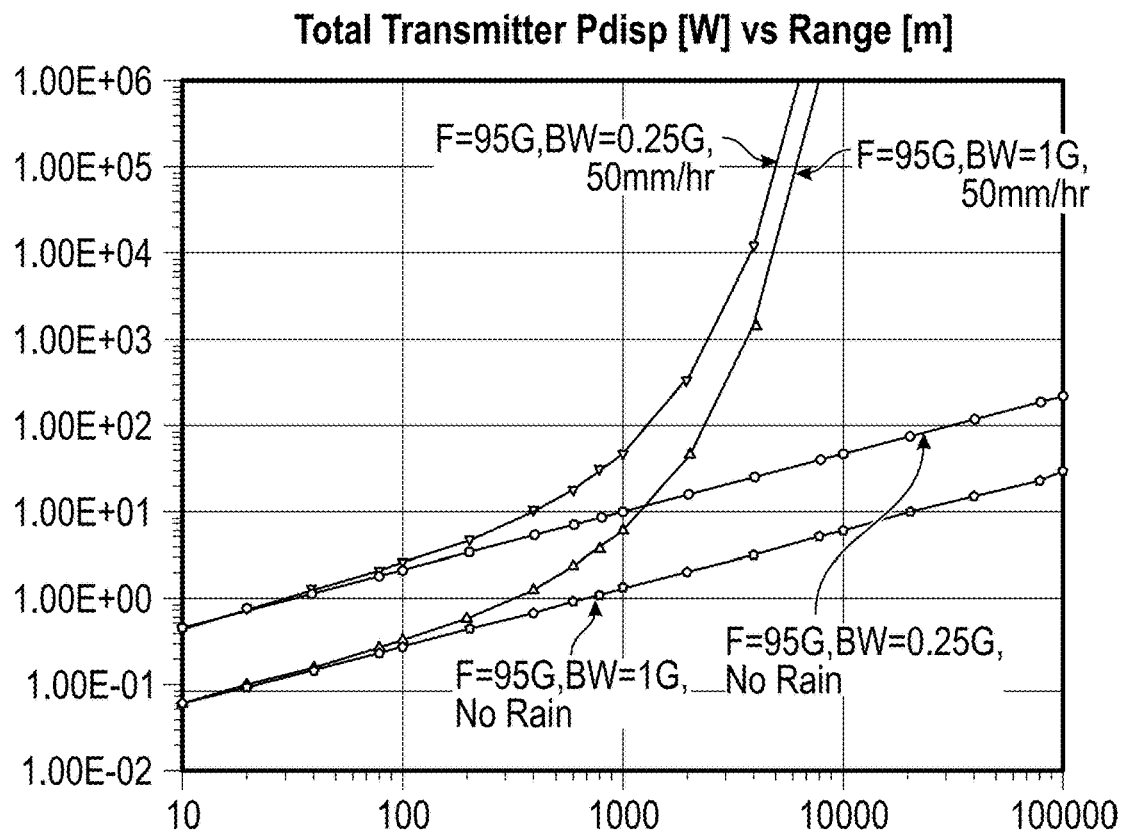
FIG. 14 is a graph with plots of total transmit power versus range for a 2 GBPS 95 GHz link with and without rain.

FIG. 14 is a graph with plots of total transmit power versus range for a 2 GBPS 95 GHz link with and without rain. The plots of total transmit power versus range with and without rain for two different bandwidths (1 GHz and 0.25 GHz) are shown in FIG. 14. For the 1 GHz bandwidth case, the transmit power at 1 km is 1.3 W without rain and 6 W with 20 dB/km rain loss. One kilometer may be the practical limit for high capacity communications under heavy rain conditions since power consumption for longer ranges can become excessively large, for example pushing range to 2 km can increase power consumption to 50 Watts for the 1 GHz bandwidth case plotted in FIG. 14.

Losses associated with rain can constrain applications in outdoor environments to shorter ranges. At the same time, high frequency antenna arrays can be attractive since under most conditions such antenna arrays can provide high capacity at reduced power consumption, which can provide an overall energy savings in applications where range is relatively short and/or rain is unlikely. For examples, in stadiums (e.g., for sporting events), the range is typically relatively short and there are many other indoor applications where rain is not an issue. Other applications include, but are not limited to, low earth orbit (LEO), medium earth orbit (MEO), geostationary earth orbit (GEO) satellite communication cross links.

Applications, Terminology, and Conclusion

In the embodiments described above, apparatus, systems, and methods for efficient wireless communication with adaptive phased antenna arrays are described in connection with particular embodiments. It will be understood, however, that the principles and advantages of the embodiments can be used for any other systems, apparatus, or methods with a need for an adaptive phased antenna array. Moreover, any suitable principles and advantages disclosed herein can be implemented in systems and in methods that include a phased antenna array.

In the embodiments described above, sensors, circuits, systems, and methods for wireless communications are described in connection with particular embodiments. It will be understood, however, that the principles and advantages of the embodiments can be used for any other suitable circuits, apparatus, systems, and methods with wireless communications.

The principles and advantages described herein can be implemented in various apparatuses. Examples of such apparatuses can include, but are not limited to, communications infrastructure such as wireless communications infrastructure, consumer electronic products, parts of the consumer electronic products, electronic test equipment, vehicular electronic products, industrial electronic products, etc. Electronic products can include, but are not limited to, base stations such as cellular base stations, access points, repeaters, relays, wireless communication devices, a mobile phone (for example, a smart phone), a hand-held computer, a tablet computer, a laptop computer, a wearable computing device, a vehicular electronics system, a radio, a wearable health monitoring device, etc. Further, apparatuses can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual embodiment (assuming that the functionality of the depicted circuits is not adversely affected). Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings of the embodiments provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments of the inventions have been described, these embodiments have been presented by way of example only, and are not intended to limit the scope of the disclosure. Indeed, the novel circuits, methods, and systems described herein may be embodied in a variety of other forms. Furthermore, various omissions, substitutions and changes in the form of the circuits, methods, apparatus and systems described herein may be made without departing from the spirit of the disclosure. For example, while the disclosed embodiments are presented in given arrangements, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure. Accordingly, the scope of the present inventions is defined by reference to the claims.

Although the claims presented here are in single dependency format for filing at the USPTO, it is to be understood that any claim may depend on any preceding claim of the same type except when that is clearly not technically feasible.

What is claimed is:

1. A radio frequency system with energy efficient wireless communication, the radio frequency system comprising:
   a phased antenna array comprising antenna elements, the phased antenna array configured to wirelessly exchange data over a link at a radio frequency; and
   a control circuit configured to selectively active individual antenna elements of the antenna elements,
   wherein the radio frequency system is configured to maintain a spectral efficiency in a spectral efficiency range from 1 bit per second per Hertz ((bit/s)/Hz) to 4 (bit/s)/Hz and a peak to average power ratio (PAPR) in a PAPR range from 0 decibels (dB) to 6 dB for wirelessly exchanging data over the link as different numbers of the antenna elements are activated.

2. The radio frequency system of claim 1, wherein the control circuit is configured to selectively activate the individual antenna elements based on a range associated with the link.

3. The radio frequency system of claim 1, wherein the control circuit is configured to selectively activate the individual antenna elements based on interference associated with the link so as to compensate for the interference.

4. The radio frequency system of claim 1, wherein the control circuit is configured to selectively activate the individual antenna elements of the antenna elements based on a weather condition so as to compensate for loss in the weather condition.

5. The radio frequency system of claim 4, wherein the weather condition comprises rain.

6. The radio frequency system of claim 1, further comprising a power amplifier in a signal path to an antenna element of the antenna elements, wherein the control circuit is configured to turn off the power amplifier such that the power amplifier is off when the antenna element is deactivated.

7. The radio frequency system of claim 1, wherein the radio frequency is in a range from 90 gigahertz (GHz) to 300 GHz.

8. The radio frequency system of claim 1, wherein the link has a bandwidth of at least 0.25 gigahertz (GHz).

9. The radio frequency system of claim 1, wherein the link has a capacity in a range from 0.5 gigabits per second (GBPS) to 5 GBPS.

10. The radio frequency system of claim 1, wherein the PAPR range is from 0 dB to 3 dB.

11. The radio frequency system of claim 1, wherein the control circuit is configured to selectively activate the individual antenna elements such that power per bit varies by no more than +/−2 dB.

12. A method of energy efficient wireless communication, the method comprising:
   wirelessly transmitting first data using antenna elements of a phased antenna array;
   dynamically activating at least one additional antenna element of the phased antenna array; and
   wirelessly transmitting second data using the antenna elements and the at least one additional antenna element of the phased antenna array,
   wherein the first data and the second data are wirelessly transmitted with a spectral efficiency maintained in a range from 1 bit per second per Hertz ((bit/s)/Hz) to 4 (bit/s)/Hz and a peak to average power ratio (PAPR) maintained in a range from 0 decibels (dB) to 6 dB.

13. The method of claim 12, wherein the dynamically activating is based on an increase in range associated with the wirelessly transmitting the second data relative to the wirelessly transmitting the first data.

14. The method of claim 12, wherein the dynamically activating is based on an increase in a rain rate.

15. The method of claim 12, wherein the dynamically activating comprises turning on a power amplifier in a signal path to the one additional antenna element.

16. The method of claim 12, wherein the wirelessly transmitting the first data is performed over a link at a radio frequency in a range from 90 gigahertz (GHz) to 300 GHz.

17. The method of claim 12, wherein power per bit varies by less than +/−2 dB for the wirelessly transmitting the second data relative to the wirelessly transmitting the first data.

18. The method of claim 12, wherein the phased antenna array has more antenna elements activated for the wirelessly transmitting the first data than an antenna array of on a wireless device that receives the first data from the phased antenna array.

19. A wireless communication system with energy efficient wireless communication, the wireless communication system comprising:
   a phased antenna array comprising antenna elements, the phased antenna array configured to wirelessly transmit data over a link at a radio frequency;
   a radio frequency front end comprising power amplifiers and control circuitry, the power amplifiers being in signal paths to the antenna elements, and the control circuitry configured to selectively activate one or more of the power amplifiers; and
   a baseband unit in communication with the radio frequency front end,
   wherein the wireless communication system is configured to maintain a spectral efficiency in a spectral efficiency range from 1 bit per second per Hertz ((bit/s)/Hz) to 4 (bit/s)/Hz and a peak to average power ratio (PAPR) in a PAPR range from 0 decibels (dB) to 6 dB as different numbers of the power amplifiers are activated for wirelessly transmitting data over the link.

20. The wireless communication system of claim 19, wherein the PAPR range is from 0 dB to 3 dB.

* * * * *